US008209511B2

(12) United States Patent
Tomita et al.

(10) Patent No.: US 8,209,511 B2
(45) Date of Patent: Jun. 26, 2012

(54) STORAGE MANAGEMENT APPARATUS, A STORAGE MANAGEMENT METHOD AND A STORAGE MANAGEMENT PROGRAM

(75) Inventors: Takumi Tomita, Yokohama (JP); Nobuo Beniyama, Yokohama (JP); Yuji Mizote, Kamakura (JP); Satoshi Fukuda, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 819 days.

(21) Appl. No.: 12/255,869

(22) Filed: Oct. 22, 2008

(65) Prior Publication Data
US 2010/0049934 A1 Feb. 25, 2010

(30) Foreign Application Priority Data

Aug. 22, 2008 (JP) ................. 2008-214485

(51) Int. Cl.
G06F 12/02 (2006.01)
(52) U.S. Cl. ........................ 711/165; 711/114
(58) Field of Classification Search .......... None
See application file for complete search history.

(56) References Cited

U.S. PATENT DOCUMENTS

| 6,571,258 | B1 | 5/2003 | Borowsky et al. |
| 7,185,164 | B2 | 2/2007 | Kusama et al. |
| 7,512,754 | B1* | 3/2009 | Chaitanya et al. ............ 711/158 |
| 2003/0188085 | A1* | 10/2003 | Arakawa et al. .............. 711/100 |
| 2006/0129771 | A1 | 6/2006 | Dasgupta et al. |
| 2006/0179220 | A1* | 8/2006 | Soejima et al. ............... 711/114 |
| 2007/0050588 | A1* | 3/2007 | Tabata et al. ................. 711/165 |
| 2007/0143542 | A1* | 6/2007 | Watanabe et al. ............. 711/114 |
| 2008/0216086 | A1* | 9/2008 | Tanaka et al. ................. 718/105 |
| 2009/0271485 | A1* | 10/2009 | Sawyer et al. ............... 709/206 |
| 2009/0300283 | A1* | 12/2009 | Kudo ............................ 711/114 |

FOREIGN PATENT DOCUMENTS

| EP | 1 632 841 | 3/2006 |
| JP | 2003-005920 | 1/2003 |
| JP | 2005-234834 | 9/2005 |
| JP | 2006-185413 | 7/2006 |
| WO | WO 2007/048690 | 5/2007 |

OTHER PUBLICATIONS

European Search Report in European Patent Application No. 09251132.8-1245/2157506 mailed Nov. 8, 2010.

* cited by examiner

Primary Examiner — Kaushikkumar Patel
(74) Attorney, Agent, or Firm — Brundidge & Stanger, P.C.

(57) ABSTRACT

A storage management apparatus performs migration considering an I/O load that will be generated during migration between a source array group and a destination array group. To migrate data from the source array group to the destination array group, a bandwidth that is available for use between the source and destination array groups is calculated. A volume that is within the source array group, and that has a write I/O amount that is smaller than the calculated bandwidth, is selected as the source volume for the migration, wherein the write I/O amount is the information transmission amount of information that is written. Data is thus migrated from the selected volume to the movement destination array group.

15 Claims, 21 Drawing Sheets

FIG. 2

121 ARRAY GROUP PERFORMANCE TABLE

| ARRAY GROUP ID | ARRAY GROUP USAGE RATE (%) | MAXIMUM PROCESSING AMOUNT (MB/s) |
|---|---|---|
| AG1 | 95 | 400 |
| AG2 | 85 | 400 |
| AG3 | 30 | 400 |
| AG4 | 85 | 100 |

FIG. 3

122 VOLUME PERFORMANCE TABLE

| VOLUME ID | USAGE CAPACITY (GB) | Read I/O AMOUNT (MB/s) | Write I/O AMOUNT (MB/s) |
|---|---|---|---|
| LU01 | 100 | 10 | 10 |
| LU02 | 250 | 25 | 5 |
| LU03 | 250 | 25 | 15 |
| LU04 | 200 | 20 | 20 |
| ⋮ | ⋮ | ⋮ | ⋮ |

123 BANDWIDTH TABLE

| MOVEMENT SOURCE ARRAY GROUP ID | MOVEMENT DESTINATION CANDIDATE ARRAY GROUP ID | BANDWIDTH (MB/s) |
|---|---|---|
| AG1 | AG2 | 20 |
| AG2 | AG3 | 20 |
| AG3 | AG4 | 15 |

FIG. 5

124 ANALYSIS RESULT TABLE

| MOVEMENT SOURCE ARRAY GROUP ID | MOVEMENT DESTINATION CANDIDATE ARRAY GROUP ID | VOLUME ID | MOVEMENT TIME | MOVEMENT EFFECT | | |
|---|---|---|---|---|---|---|
| | | | | ARRAY GROUP USAGE RATE (BEFORE MOVEMENT: %) | ARRAY GROUP USAGE RATE (AFTER MOVEMENT: %) | MIGRATION EFFECT (REDUCTION: MB/s) |
| AG1 | AG2 | LU01 | 2HOURS 46MINUTES 40SECONDS | 95 | 90 | 20 |
| AG1 | AG2 | LU02 | 4HOURS 37MINUTES 46SECONDS | 95 | 88 | 30 |
| AG1 | AG2 | LU03 | 13HOURS 53MINUTES 20SECONDS | 95 | 85 | 40 |
| AG1 | AG3 | LU01 | 2HOURS 46MINUTES 40SECONDS | 95 | 90 | 20 |
| AG1 | AG3 | LU02 | 4HOURS 37MINUTES 46SECONDS | 95 | 88 | 30 |
| AG1 | AG3 | LU03 | 13HOURS 53MINUTES 20SECONDS | 95 | 85 | 40 |
| AG1 | AG4 | LU02 | 13HOURS 53MINUTES 20SECONDS | 95 | 88 | 30 |
| AG1 | AG4 | LU03 | 2HOURS 46MINUTES 40SECONDS | 95 | 85 | 40 |

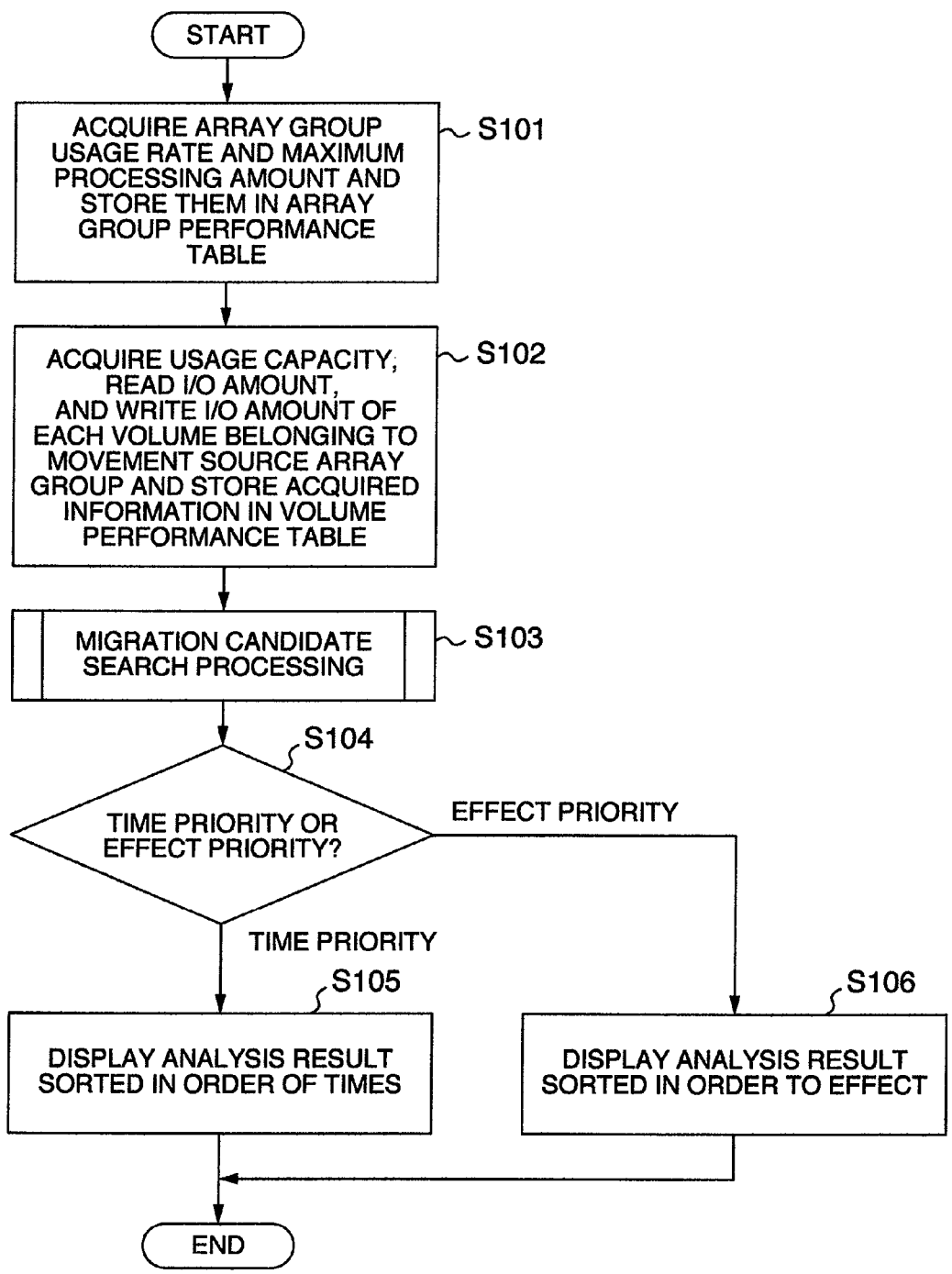

FIG. 11

125 PERIOD TABLE

| PERIOD ID | PERIOD |
|---|---|
| PERIOD 1 | FIRST DAY 0:00 – 12:00 |
| PERIOD 2 | FIRST DAY 12:00 – 24:00 |
| PERIOD 3 | SECOND DAY 0:00 – 12:00 |
| PERIOD 4 | SECOND DAY 12:00 – 24:00 |

FIG. 12

126 PERIOD BANDWIDTH TABLE

| PERIOD ID | BANDWIDTH BETWEEN ARRAY GROUPS [MB/s] | | | MOVEMENT SOURCE CANDIDATE VOLUME I/O AMOUNT [MB/s] | | | | | | | | |
|---|---|---|---|---|---|---|---|---|---|---|---|---|
| | | | | LU01 | | LU02 | | LU03 | | LU04 | | |
| | AG2 | AG3 | AG4 | R | W | R | W | R | W | R | W | ... |
| PERIOD 1 | 20 | 20 | 15 | 10 | 10 | 25 | 10 | 25 | 15 | 20 | 20 | ... |
| PERIOD 2 | 10 | 10 | 20 | 10 | 25 | 25 | 5 | 25 | 10 | 30 | 20 | ... |
| PERIOD 3 | 5 | 10 | 20 | 25 | 25 | 25 | 5 | 25 | 10 | 30 | 10 | ... |
| PERIOD 4 | 5 | 20 | 20 | 10 | 10 | 25 | 5 | 25 | 15 | 20 | 10 | ... |

127 PERIOD ANALYSIS TABLE

| MOVEMENT SOURCE ARRAY GROUP ID | MOVEMENT DESTINATION CANDIDATE ARRAY GROUP ID | MOVEMENT SOURCE CANDIDATE VOLUME ID | CAPACITY OF VOLUME FROM WHICH DATA IS MOVABLE IN EACH PERIOD [GB] | | | | |
|---|---|---|---|---|---|---|---|
| | | | PERIOD 1 | PERIOD 2 | PERIOD 3 | PERIOD 4 | ... |
| AG1 | AG2 | LU01 | 432 | × | × | × | ... |
| AG1 | AG2 | LU02 | 432 | × | × | × | ... |
| AG1 | AG3 | LU02 | 432 | 216 | 216 | 648 | ... |
| AG1 | AG4 | LU02 | 216 | 648 | 648 | 648 | ... |
| AG1 | AG4 | LU04 | × | × | 432 | 432 | ... |

128 PERIOD ANALYSIS RESULT TABLE

| MOVEMENT SOURCE ARRAY GROUP ID | MOVEMENT DESTINATION CANDIDATE ARRAY GROUP ID | MOVEMENT SOURCE CANDIDATE VOLUME ID | TIME ZONE | MOVEMENT EFFECT | | MIGRATION EFFECT (REDUCTION: MB/s) |
|---|---|---|---|---|---|---|
| | | | | ARRAY GROUP USAGE RATE (BEFORE MOVEMENT: %) | ARRAY GROUP USAGE RATE (AFTER MOVEMENT: %) | |
| AG1 | AG2 | LU01 | FIRST DAY 0:00-2:46 (10000s) | 95 | 87 | 31 |
| AG1 | AG3 | LU02 | FIRST DAY 0:00-4:37 (25000s) | 95 | 87 | 30 |
| AG1 | AG3 | LU02 | FIRST DAY 12:00-25:53 (50000s) | 95 | 87 | 30 |
| AG1 | AG4 | LU04 | SECOND DAY 0:00-5:33 (20000s) | 95 | 85 | 40 |

1281

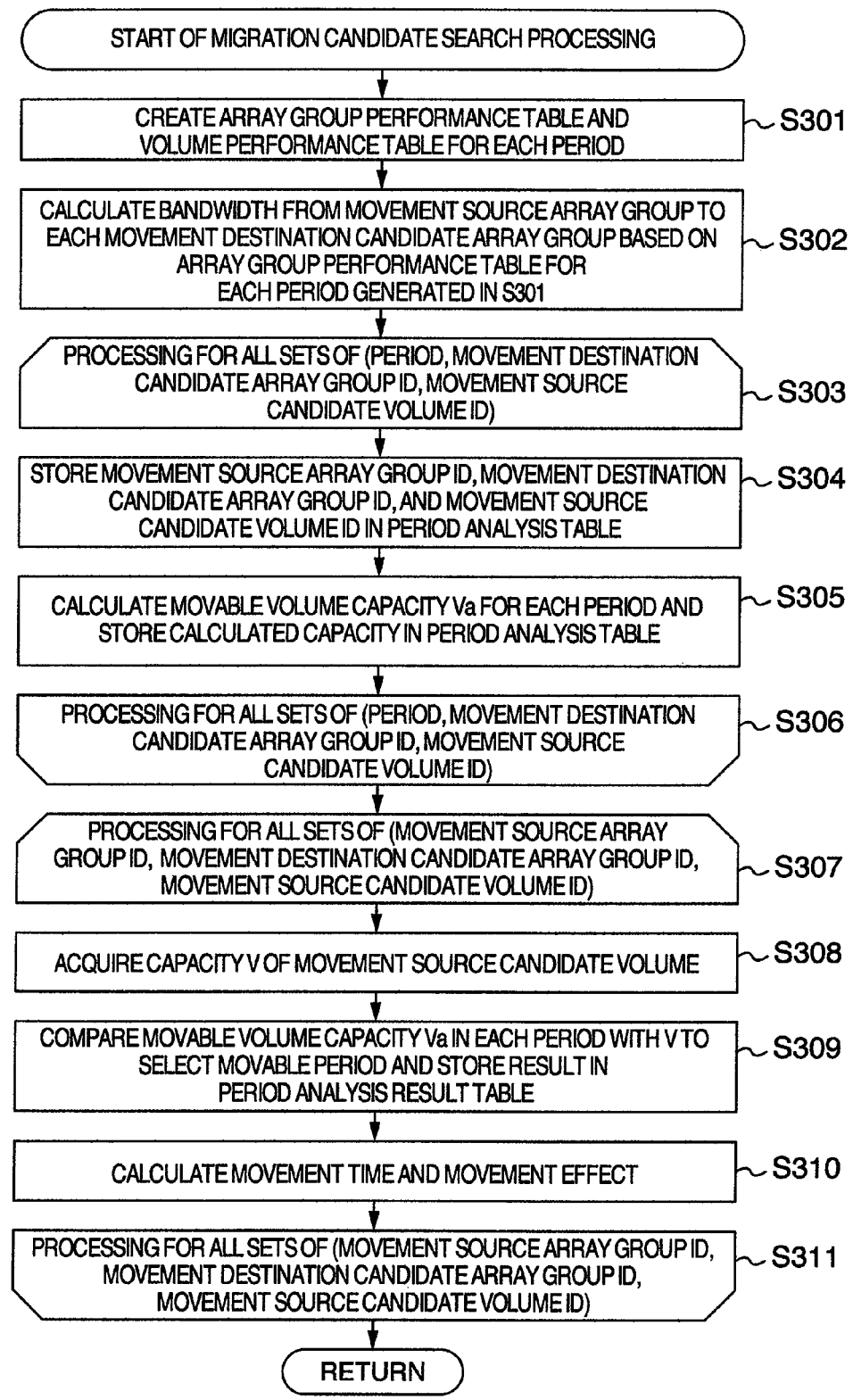

FIG. 18

121b ARRAY GROUP PERFORMANCE TABLE

| RESOURCE ID | ARRAY GROUP USAGE RATE (PORT PROCESSOR USAGE RATE: %) | MAXIMUM PROCESSING AMOUNT (PORT PROCESSOR MAXIMUM PROCESSING AMOUNT: MB/s) |
|---|---|---|
| AG1 | 95 | 400 |
| P1 | 50 | 400 |
| P2 | 70 | 400 |
| AG4 | 85 | 100 |

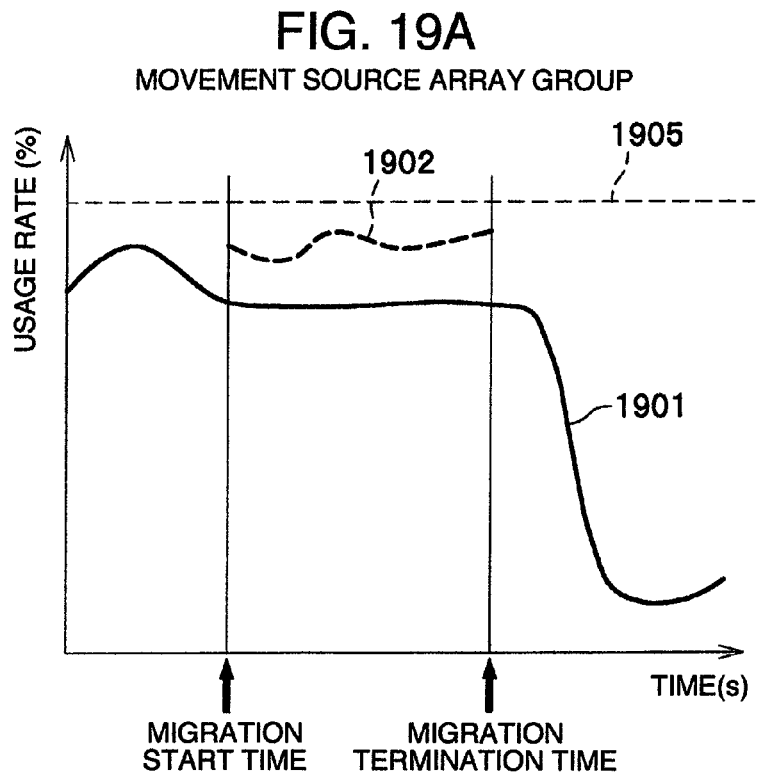
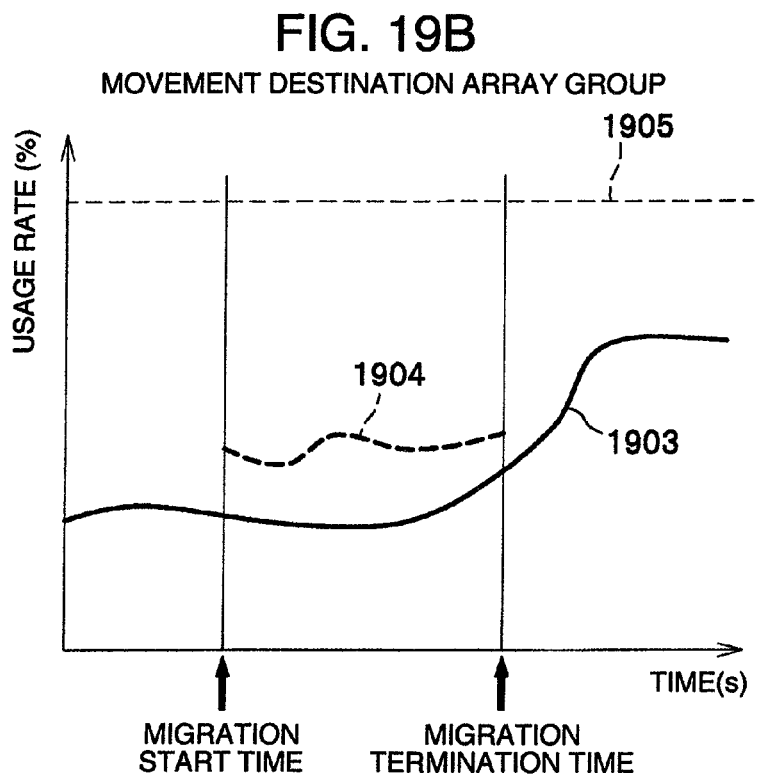

STORAGE MANAGEMENT APPARATUS, A STORAGE MANAGEMENT METHOD AND A STORAGE MANAGEMENT PROGRAM

INCORPORATION BY REFERENCE

The present application claims priority from Japanese application JP2008-214485 filed on Aug. 22, 2008, the content of which is hereby incorporated by reference into this application.

BACKGROUND OF THE INVENTION

The present invention relates to a technology for a storage management apparatus, a storage management method, and a storage management program.

When the amount of I/O (input/output) from operation servers to a particular storage resource (array group, disk processor, port processor, etc.) is increased and the storage resource is overloaded, the performance of the storage apparatus having the storage resource is degraded. In this case, to reduce the amount of I/O (access load) on the storage resource, the storage manager must find a high I/O load array group, select a high I/O load volume (I/O concentrated volume) from the array group, and move data from the selected volume to a low I/O load array group to solve the performance bottleneck. This operation is called migration.

As a technology for reducing the I/O load concentrated on a particular array group, a migration technology for best balancing the I/O loads of the array groups after the migration is disclosed (for example, see JP-A-2003-005920).

Another disclosed technology is a migration method that satisfies a user-specified policy according to the I/O performance requested by an operation server for each volume (for example, see JP-A-2005-234834).

SUMMARY OF THE INVENTION

When migration is performed, an extra I/O load is generated for moving data from a volume to another array group. This extra I/O load adds an I/O load to an overloaded array group (from which data is being migrated), possibly affecting an operation server that is using the storage resource (for example, lower response time). In addition, if an operation server issues write I/O requests to the volume, from which data is being migrated, so frequently that the amount of write I/O exceeds the amount of data that is moved for migration, the migration is not be terminated for a long time and, as a result, the migration will sometimes fail.

That is, according to the technology disclosed in JP-A-2003-005920, data can be moved (migrated) from some specific volume of a high I/O load array group to another array group to balance the I/O load among array groups. The problem with this method is that, because the I/O load for moving the content of a volume during the migration is not taken into consideration, the migration will sometimes fail if the amount of write I/O for the selected volume is higher than the bandwidth required for the migration. A bandwidth, which is the amount of data that can be moved during migration, is the amount of processing available between array groups. The bandwidth will be defined later more in detail.

That is, if the amount of write I/O for a volume exceeds the amount of data (bandwidth) to be moved for migration as described above, the migration will not be terminated for a long time and, as a result, the migration will sometimes fail.

The technology disclosed in JP-A-2005-234834 also allows the user to create a migration plan with the volume I/O amount taken into consideration. However, this technology either does not consider the I/O load that may be generated during migration.

In view of the foregoing, it is an object of the present invention to provide a technology for migration with an I/O load, which is generated during the migration, taken into consideration.

To solve the problems described above, the technology according to the present invention calculates a bandwidth that is the amount of information transmittable between a movement source array group and a movement destination array group, selects a volume whose write transmission amount that is the amount of information transmitted for writing information is smaller than the calculated bandwidth, and migrates data from the selected volume to the movement destination array group.

The present invention allows the user to migrate data with an I/O load, which will be generated during migration, taken into consideration.

BRIEF DESCRIPTION OF THE DRAWINGS

FIG. 2 is a diagram showing an example of the configuration of an array group performance table in the first embodiment.

FIG. 3 is a diagram showing an example of the configuration of a volume performance table in the first embodiment.

FIG. 5 is a diagram showing an example of the configuration of an analysis result table in the first embodiment.

FIG. 6 is a flowchart showing the flow of storage management processing in the first embodiment.

FIG. 11 is a diagram showing an example of the configuration of a period table in the second embodiment.

FIG. 12 is a diagram showing an example of the configuration of a period bandwidth table in the second embodiment.

FIG. 13 is a diagram showing an example of the configuration of a period analysis table in the second embodiment.

FIG. 14 is a diagram showing an example of a period analysis result table in the second embodiment.

FIG. 15 is a flowchart showing the flow of migration candidate search processing in the second embodiment.

FIG. 18 is a diagram showing an example of the configuration of an array group performance table in the third embodiment.

FIG. 19A is a diagram showing an example of an array group usage rate monitor screen for the movement source in a fourth embodiment, and FIG. 19B is a diagram showing an example of a screen for the movement destination array group.

DESCRIPTION OF THE EMBODIMENTS

Next, the best modes (called embodiments) of carrying out the present invention will be described in detail with reference to the drawings as necessary.

First Embodiment

System Configuration

Figure 1:
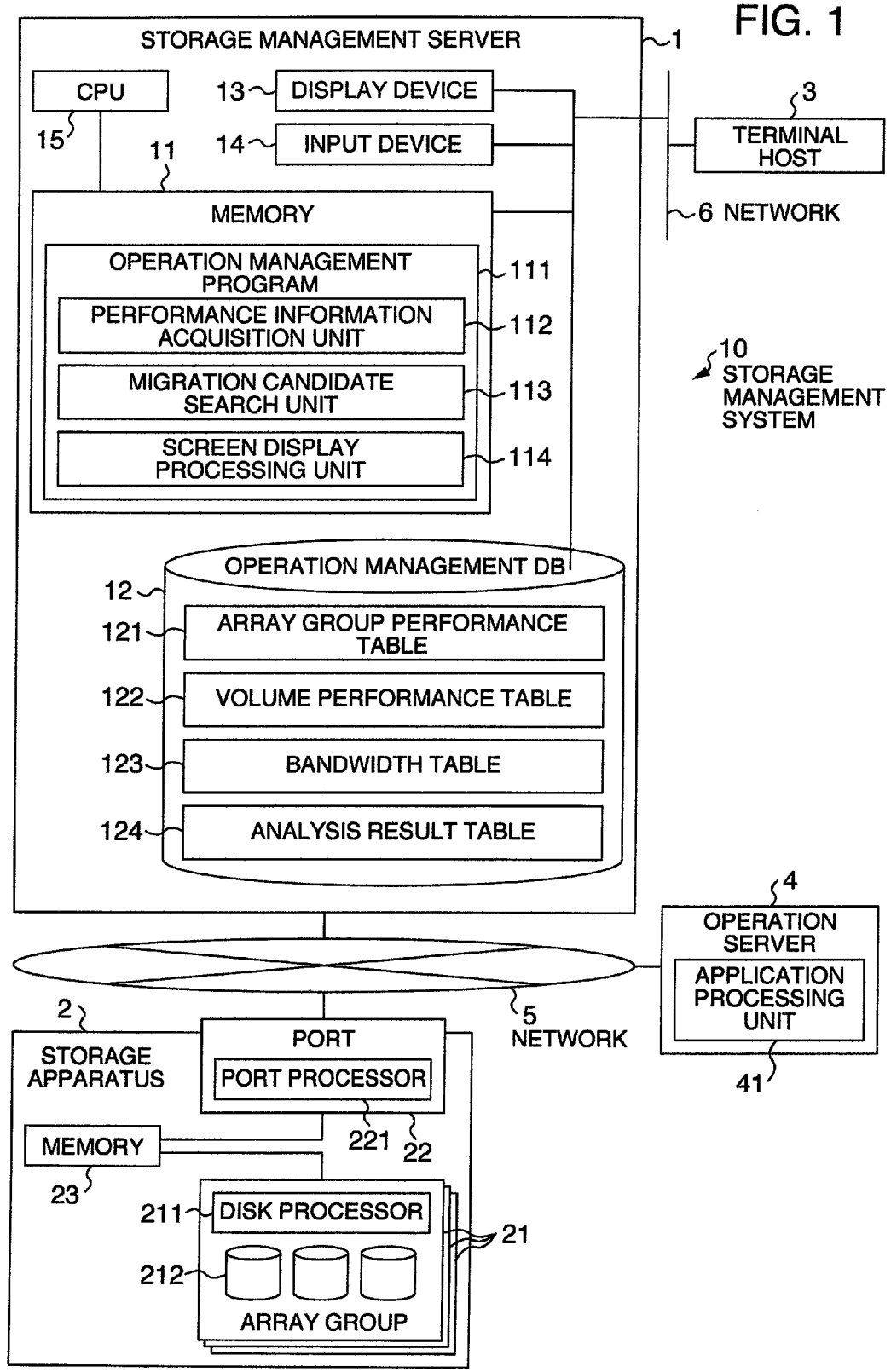
FIG. 1 is a diagram showing an example of the system configuration in a first embodiment.

FIG. 1 is a diagram showing an example of the system configuration in a first embodiment.

A storage management system 10 comprises a terminal host 3, a storage management server 1 (storage management apparatus), a storage apparatus 2, and an operation server 4.

The storage management server 1, storage apparatus 2, and operation server 4 are interconnected via a network 5 such as a SAN(Storage Area Network). When a SAN is used as the network 5, data is transferred among the apparatuses 1, 2, and 4, for example, based on FCP (Fibre Channel Protocol). The storage management server 1 and the terminal host 3 are connected via a network 6 such as a LAN (Local Area Network) or a WAN (Wide Area Network). The operation server 4 has at least one application processing unit 41.

The storage management server 1 comprises a CPU (Central Processing Unit) 15, a memory 11, a display device 13, an input device 14, and an operation management DB (database) 12 (storage unit).

The display device 13, such as a display, is a device on which information is displayed. The input device 14, such as a keyboard and a mouse, is a device used to input information into the storage management server 1.

The storage management server 1 manages the operation of the operation server 4 and the storage apparatus 2. In particular, the storage management server 1 in the first embodiment controls data movement (migration) on volumes 212 performed in the storage apparatus 2.

An operation management program 111 (operation management unit), which has the function to perform migration, comprises a performance information acquisition unit 112, a migration candidate search unit 113, and a screen display processing unit 114. The performance information acquisition unit 112, migration candidate search unit 113 (volume search unit), and screen display processing unit 114 are implemented by expanding the operation management program 111, stored in a ROM (Read Only Memory) or a HD (Hard disk), into a RAM (Random Access Memory: memory 11) for execution by the CPU 15.

The performance information acquisition unit 112 has the function to acquire array group performance information (which will be described alter) on array groups 21 and volume performance information (which will be described later) on the volumes 212 in the storage apparatus 2. The migration candidate search unit 113 has the function to list pairs of the candidate of a volume 212 from which data is to be migrated (movement source candidate volume) and the candidate of an array group 21 to which data of the volumes 212 is to be migrated (movement destination candidate array group), based on the performance information acquired by the performance information acquisition unit 112. The listed pairs of migration candidates are displayed on the display device 13 by the screen display processing unit 114. The user checks the displayed information to set a time priority policy or a migration effect priority policy, and the screen display processing unit 114 sorts the listed migration candidate pairs according to the policy. The user selects one of migration candidates and instructs the execution of migration, and the operation management program 111 executes the migration.

The operation management DB 12 stores an array group performance table 121, a volume performance table 122, a bandwidth table 123, and an analysis result table 124.

The array group performance table 121 is a table for storing information on the I/O processing of the array groups 21 in the storage apparatus 2. The volume performance table 122 is a table for storing information on the storage capacity and the I/O load of the volumes 212 belonging to the array groups 21. The bandwidth table 123 is a table for storing bandwidths between different array groups 21 calculated based on the array group performance table 121. The analysis result table 124 is a table for storing the list of migration candidates. The array group performance table 121, volume performance table 122, bandwidth table 123, and analysis result table 124 will be described later with reference to FIG. 2 to FIG. 5.

The storage apparatus 2 comprises a port 22, a memory 23, and multiple array groups 21. The port 22 has a port processor 221, and each array group 21 has a disk processor 211. The port 22 may have multiple port processors 221, and the array group 21 may have multiple disk processors 211. Each array group 21 has one or more volumes 212, and the storage apparatus 2 provides the operation server 4 with those volumes 212. That is, the application processing unit 41 of the operation server 4 reads programs from the volumes 212 in the storage apparatus 2 for execution and uses various applications.

Next, the following describes data flow between the operation server 4 and the storage apparatus 2. The port processor 221 controls the data transfer between the operation server 4 and the storage apparatus 2. Similarly, the disk processor 211 controls the data transfer to and from the volumes 212 in the array group 21. The port processor 221, memory 23, and disk processor 211 are related as follows. When the Read command is received from the operation server 4 (application processing unit 41), the port processor 221 stores the Read command in the memory 23. The disk processor 211 constantly monitors the memory 23 and, when an unprocessed Read command is detected, reads data from the volume 212 specified by the Read command and sends the data to the operation server 4. Similarly, when the Write command is received from the operation server, the port processor 221 stores the Write command in the memory 23. At this time, the disk processor 211 reads the Write command and data stored in the memory 23 and stores the data in a predetermined volume 212.

Although each of the apparatuses 1-4 comprises one apparatus in FIG. 1, each may comprise multiple apparatuses.

Next, the following describes the tables with reference to FIG. 2 to FIG. 5 while referring to FIG. 1 as necessary.
(Array Group Performance Table)

FIG. 2 is a diagram showing an example of the configuration of the array group performance table in the first embodiment.

The array group performance table 121 has the following columns: array group ID, array group usage rate (in percents), and maximum processing amount (in MB/s).

The array group ID is a unique identifier assigned to an array group 21 in the storage apparatus 2. The array group usage rate, which is acquired from the disk processor 211, quantitatively represents the I/O amount currently processed in the array group 21. The maximum processing amount, which is acquired from the disk processor 211, represents the maximum I/O amount processable in the corresponding array group 21. The relation between the array group usage rate and the maximum processing amount is as follows. For example, for the array group ID "AG1", when the array group usage rate is 10% for the array group 21 whose maximum processing amount is 400 MB/s, the I/O amount actually processed in this array group 21 is 40 (=400×0.1) MB/s.

(Volume Performance Table)

FIG. 3 is a diagram showing an example of the configuration of the volume performance table in the first embodiment.

The volume performance table 122 has the following columns: volume ID, usage capacity (in GB), read I/O amount (in MB/s), and write I/O amount (write transmission amount: in MB/s).

The volume ID is a unique identifier assigned to a volume 212. The usage capacity is the current usage capacity of the volume 212. The read I/O amount is the usage amount of performance resource for the volume 212, for example, the transfer speed of data when data is read from the corresponding volume 212 (10 MB/s for volume 212 with the volume ID of LU01, etc.). Similarly, the write I/O amount is the usage amount of performance resource of the volume 212, for example, the transfer speed of data when data is written to the corresponding volume 212 (20 MB/s for the volume 212 with the volume ID of LU04, etc.). The volume ID and the array group ID are related by the array group configuration table not shown.

(Bandwidth Table)

Figure 4:
FIG. 4 is a diagram showing an example of the configuration of a bandwidth table in the first embodiment.

FIG. 4 is a diagram showing an example of the configuration of the bandwidth table in the first embodiment.

The following describes the bandwidth. As described above, the bandwidth is the transferable amount of data of an array group 21.

For example, when the array group usage rate is a (%) and the maximum processing amount is b (MB/s) in a array group 21, the bandwidth c of this array group 21 is calculated by the following expression (1).

$$c = b \times \{1 - (a/100)\} \quad (1)$$

Expression (1) calculates the unused processing amount in the array group 21, that is, the processing amount available in the array group 21.

For example, when the array group usage rate is 50% and the maximum processing amount is 400 MB/s in an array group 21, the bandwidth is 200 MB/s. This bandwidth indicates that this array group 21 can receive another 200 MB/s of transfer data (available for use).

Next, the following describes the bandwidth between different array groups 21. When the bandwidth of the array group 21 with the array group ID of AG1 (hereinafter called array group AG1) is c1(MB/s) and the bandwidth of the array group AG2 is c2(MB/s), the bandwidth c3 between the array group AG1 and the array group AG2 is calculated by expression (2) given below.

$$c3 = \min(c1, c2) \quad (2)$$

Expression (2) indicates that the bandwidth between two array groups 21 is the lower bandwidth of the two array groups 21. This is because the bandwidth (that is, data transfer amount) is determined by the lower of the two bandwidths.

For example, when the bandwidth of the array group AG1 is 20 MB/s and the bandwidth of the array group AG2 is 50 MB/s, the bandwidth between the array group AG1 and the array group AG2 is determined 20 MB/s.

The following continues the description of FIG. 4.

The bandwidth table 123 has the following columns: movement source array group ID, movement destination candidate array group ID, and the bandwidth (in MB/s). The movement source array group ID, which indicates an array group 21 whose I/O load is to be reduced, is specified by the user. The movement destination candidate array group is an array group 21 that is a candidate for the data transfer destination. The bandwidth is a bandwidth between the movement source array group and the movement destination candidate array group.

(Analysis Result Table)

FIG. 5 is a diagram showing an example of the configuration of the analysis result table in the first embodiment.

The analysis result table 124 has the following columns: movement source array group ID (fixed), movement destination array group ID (movement destination group information), volume ID of the movement source candidate volume (movement source volume information), movement time, and movement effect. In addition, the movement effect has the following columns: array group usage rate (before movement: in percents), array group usage rate (after movement: in percents), and migration effect (degree of I/O load reduction: in MB/s). The calculation of the values in this table will be described later in detail.

(General Processing)

Next, the following describes the storage management processing in the first embodiment with reference to FIG. 6 while referring to FIG. 1 to FIG. 5.

FIG. 6 is a flowchart showing the flow of the storage management processing in the first embodiment.

First, the operation management program 111 constantly monitors the usage status of the array group 21 via the disk processor 211 of the storage apparatus 2. If the usage rate of the array group 21 exceeds a pre-set threshold, the operation management program 111 outputs a warning on the display device 13 to notify the status to the user. In response to this warning, the user requests the operation management program 111, via the input device 14 or the terminal host 3, to search for a migration candidate. At this time, the operation management program 111 specifies, via the input device 14 or terminal host 3, the array group 21, whose usage rate exceeds the threshold, as the movement source array group.

When the request is received from the user, the performance information acquisition unit 112 acquires the array group usage rate and the maximum processing amount from the disk processor 211 of each array group 21 and stores them in the array group performance table 121 (S101).

Next, via the disk processor 211 of the movement source array group, the performance information acquisition unit 112 acquires the usage capacity, as well as the read I/O amount (MB/s) and write I/O amount (MB/s) from the operation server to the volume 212, of the volumes 212 belonging to the movement source array group and stores the acquired information in the volume performance table 122 (S102).

And, the migration candidate search unit 113 uses the array group performance table 121 and the volume performance table 122 to perform the migration candidate search processing (S103), and the screen display processing unit 114 creates the list of migration candidates (analysis result table 124) and displays it on the display device 13 or the terminal host 3. The migration candidate search processing in step S103 will be described later with reference to FIG. 7. The screen displayed on the display device 13 after step S103 will be described later with reference to FIG. 9.

Figure 9:
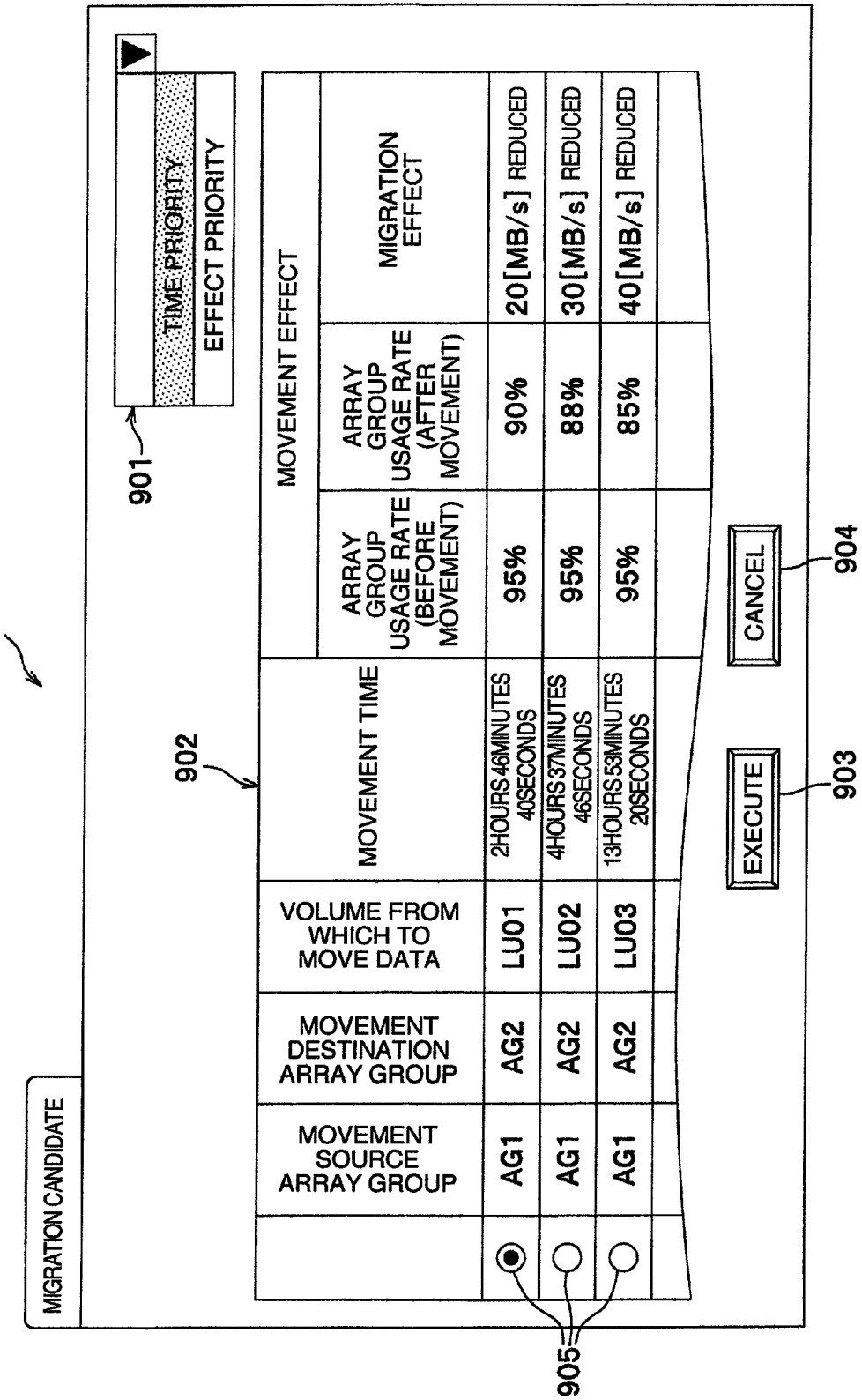
FIG. 9 is a diagram showing an example of a migration candidate display screen in the first embodiment.

Next, the user selects "Time priority" or "Effect priority" from a sort type selection area 901, shown in FIG. 9, via the input device 14 or the terminal host 3. The screen display processing unit 114 determines whether the list is to be sorted according to time priority or effect priority (S104).

If it is determined as a result of step S104 that time priority is selected (S104→time priority), the screen display processing unit 114 sorts the analysis result table 124 in ascending order of movement times (shortest first) and displays the sorted analysis result on the display device 13 or the terminal host 3 (S105).

If it is determined as a result of step S104 that effect priority is selected (S104→effect priority), the screen display processing unit 114 sorts the analysis result table 124 in descending order of migration effect (highest first) and displays the sorted analysis result on the display device 13 or the terminal host 3 (S106).

After step S105 or S106, the user presses the Execute button 903 shown in FIG. 9 via the input device 14 or the terminal host 3 to cause the operation management program 111 to start migration.

(Migration Candidate Search Processing)

Figure 7:
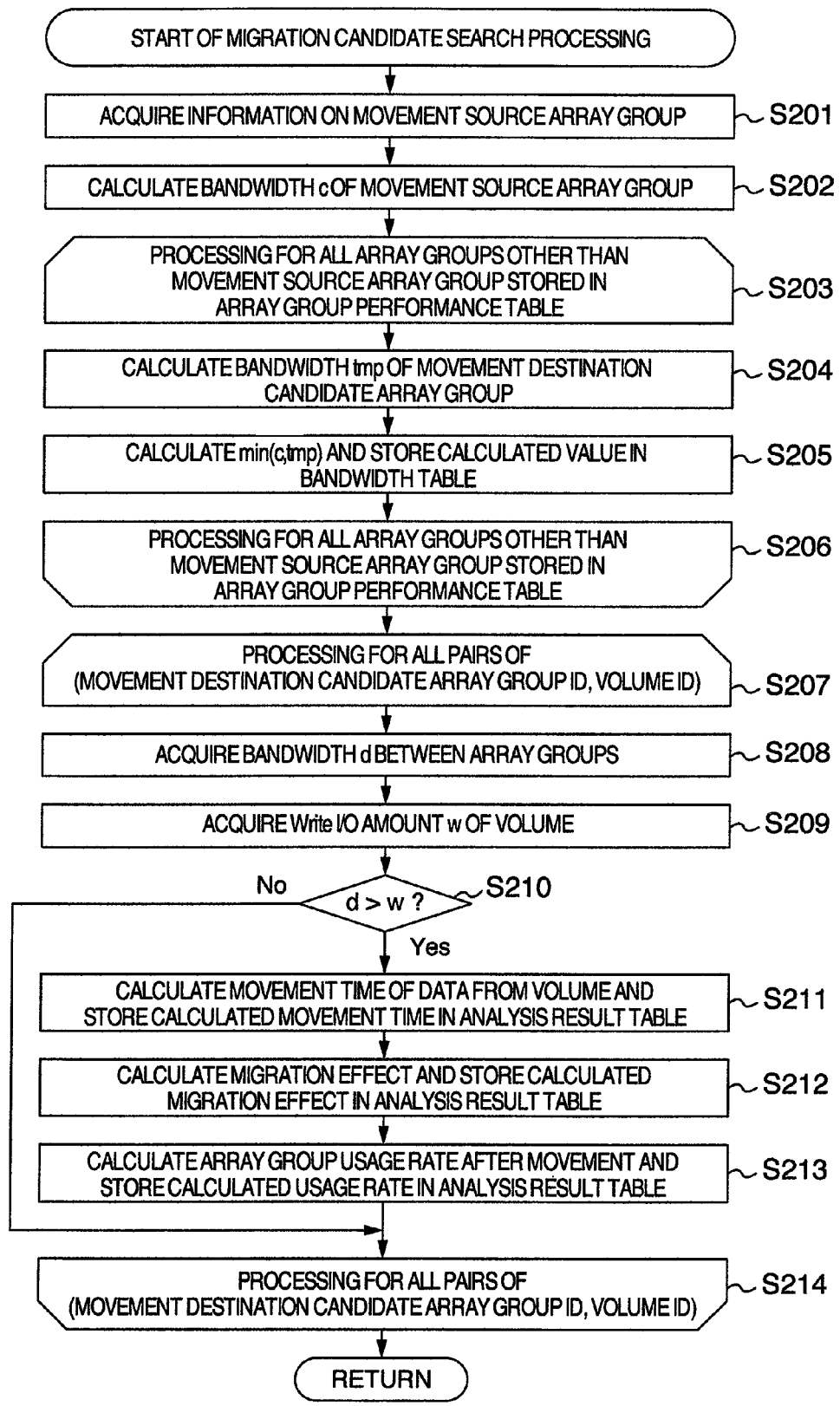
FIG. 7 is a flowchart showing the flow of migration candidate search processing in the first embodiment.

Next, the following describes in detail the migration candidate search processing (step S103 in FIG. 6) with reference to FIG. 7 while referring to FIG. 1-FIG. 5.

FIG. 7 is a flowchart showing the flow of the migration candidate search processing in the first embodiment. In FIG. 7, the analysis result table 124 is generated.

First, the migration candidate search unit 113 acquires information such as the array group usage rate and the maximum processing amount of a movement source array group, specified before step S101, based on the movement source array group ID (S201).

The migration candidate search unit 113 uses the acquired array group usage rate and the maximum processing amount to calculate the bandwidth c of the movement source array group via the expression shown in expression (1) (S202).

Next, the migration candidate search unit 113 repeats the processing of steps S204 and S205 for all array groups 21 other than the movement source array group stored in the array group performance table 121 (S203).

The migration candidate search unit 113 calculates the bandwidth tmp of a movement destination candidate array group, which is being checked, according to expression (1) (S204).

The migration candidate search unit 113 substitutes the bandwidth c of the movement source array group, calculated in step S202, and the bandwidth tmp of the movement destination candidate array group, calculated in step S204, respectively for c1 and c2 in expression (2) to calculate the bandwidth (min(c,tmp)) between the movement source array group and the movement destination candidate array group. After that, the migration candidate search unit 113 adds (stores) a set of data, composed of the calculated bandwidth, the movement source array group ID, and the movement destination candidate array group ID whose bandwidth is being checked, to the bandwidth table 123 (S205).

As described above, the migration candidate search unit 113 performs the processing of step S204 and step S205 for all array groups 21 other than the movement source array group in the array group performance table 121 (S206).

Next, the migration candidate search unit 113 repeats the processing of steps S208-S213 for all pairs of (movement destination candidate array group ID, volume ID) (S207). Note that the volume ID is the ID of a volume 212 included in the movement source array group.

First, the migration candidate search unit 113 acquires the bandwidth d between array groups 21 from the bandwidth table 123 based on the movement destination candidate array group ID which is being checked (S208).

Next, the migration candidate search unit 113 acquires the write I/O amount w of the volume 212 corresponding to the volume ID, which is being checked, from the volume performance table 122 (S209).

And, the migration candidate search unit 113 checks if d>w is satisfied (S210).

If d>w is not satisfied as a result of the checking in step S210 (S210→No), that is, if the write I/O amount for the volume 212 is equal to or higher than the data transfer speed (bandwidth) for the migration, there is a possibility that the data transfer will not be terminated for a long time. So, the migration candidate search unit 113 passes control to step S214 without outputting the migration between the movement destination candidate array group and the volume 212 to the analysis result table 124. That is, the migration candidate search unit 113 removes the volume 212, for which the migration will fail, from the movement source candidate volumes.

If d>w is satisfied as a result of the checking in step S210 (S210→Yes), that is, if the data transfer speed (bandwidth) for the migration is higher than the write I/O amount for the volume 212, the migration candidate search unit 113 calculates the data movement time (time required for the migration) of the volume 212 and stores the calculated movement time, as well as the movement source array group ID, movement destination candidate array group ID, movement source candidate volume ID, and array group usage rate before the movement, in the analysis result table 124 (S211). The movement time of the volume 212 is found by acquiring the capacity V of the volume 212, which is being checked, from the volume performance table 122 and calculating V/(d−w) by the migration candidate search unit 113.

Next, the migration candidate search unit 113 calculates the migration effect and stores the calculated migration effect in the corresponding column of the analysis result table 124 (S212). The migration effect, which is an index indicating how much I/O load of the movement source volume 212 is reduced by the execution of the migration, is calculated as "read I/O amount+write I/O amount" of the movement source volume 212. In step S212, the migration candidate search unit 113 acquires the corresponding read I/O amount and write I/O amount from the volume performance table 122 with the volume ID, which is being checked, as the key, and adds them up to calculate the migration effect. For example, the migration effect of migrating the content of volume LU01 in FIG. 3 is calculated as 10+10=20(MB/s).

After that, the migration candidate search unit 113 calculates the array group usage rate after the movement and stores the calculated array group usage rate after the movement in the corresponding column of the analysis result table 124 (S213). The array group usage rate after the movement Upost is calculated by expression (3) given below, where Upre is the array group usage rate before the movement, Emi is the migration effect calculated in step S212, and Tmax is the maximum processing mount.

$$U_{post}=U_{pre}-(100 \times Emi/T_{max}) \qquad (3)$$

In step S213, the migration candidate search unit 113 acquires the array group usage rate before the movement and the maximum processing amount from the array group performance table 121 with the movement source array group ID as the key, acquires the migration effect from the analysis result table 124, and calculates the array group usage rate after the movement from expression (3). For example, when data is moved from the volume LU01 to the array group AG2, the array group usage rate after the movement is calculated as follows. The array group performance table 121 (FIG. 2) indicates that the array group usage rate before the movement of the array group AG1 is 95% and its maximum processing amount is 400 MB/s. Also, the analysis result table 124 (FIG. 5) indicates that the migration effect is the reduction of 20 MB/s. Thus, the value of the array group usage rate after the movement of the array group AG1 is calculated as 95−100× (20/400)=90.

As described above, the migration candidate search unit 113 repeats the processing of steps S208-S213 until all pairs of (movement destination candidate array group ID, volume ID) are processed (S214).

The processing in steps S201-S214 causes the migration candidate search unit 113 to generate the analysis result table 124.

(Examples of Screen)

Figure 8A:
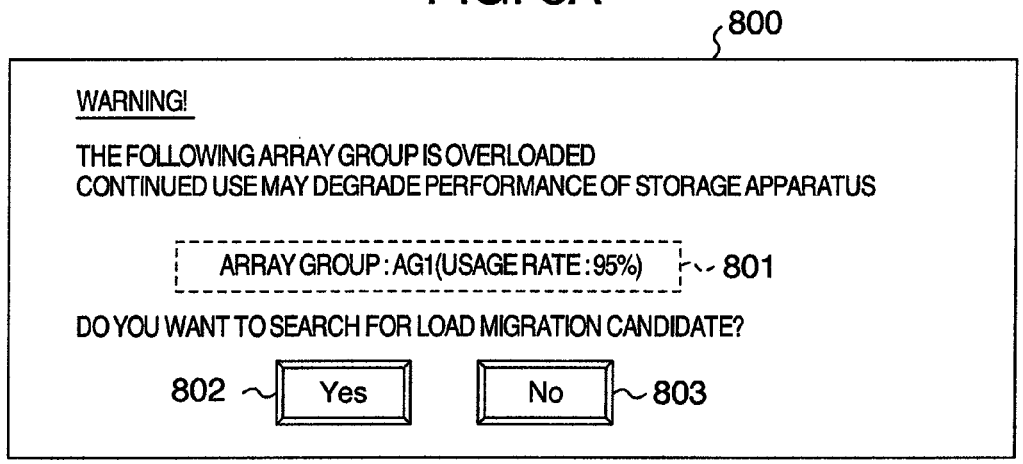
FIG. 8A is a diagram showing an alert screen that is displayed when the I/O load of an array group 21 exceeds a threshold.
Figure 8B:
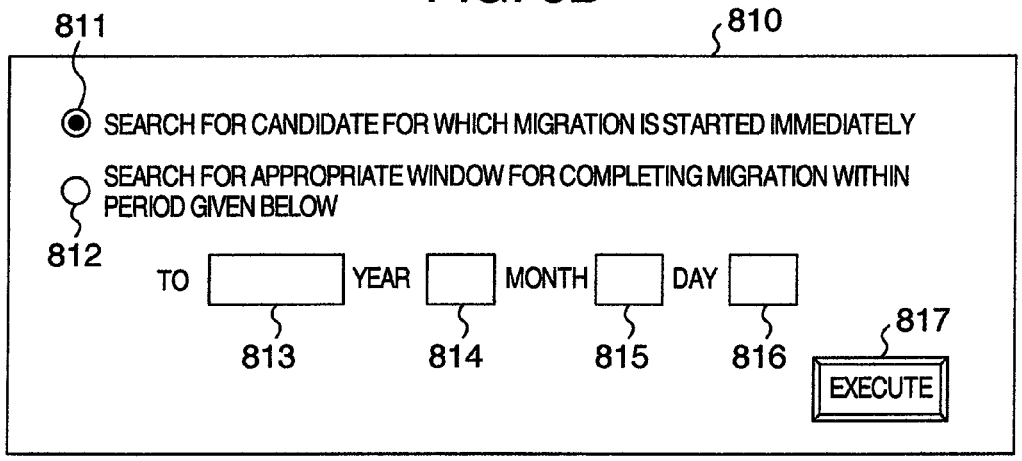
FIG. 8B is a diagram showing a migration start instruction screen.

Next, the following describes an example of screens displayed on the display device 13 with reference to FIGS. 8A and 8B and FIG. 9.

FIG. 8A is a diagram showing an alert screen that is displayed when an array group 21 whose I/O load has exceeded the threshold is generated, and FIG. 8B is a diagram showing a migration start instruction screen.

As described above, the operation management program 111 monitors all array groups 21 installed in the storage management system 10. When the array group usage rate acquired from the disk processor 211 of an array group 21 exceeds a pre-set threshold, that is, if the I/O load becomes high, the screen display processing unit 114 displays an alert screen 800, such as the one shown in FIG. 8A, on the display device 13. The ID of the array group whose threshold is exceeded is displayed in an area 801 on the alert screen. After confirming the content of the area 801, the user selects a Yes button 802 or a No button 803 via the input device 14. When the No button 803 is selected, the operation management program 111 does not perform the processing of step S101 and the subsequent steps in FIG. 6 and, so, no migration is performed.

When the Yes button 802 is selected, the screen display processing unit 114 displays a migration instruction screen 810, such as the one shown in FIG. 8B, on the display device 13.

At this time, if a radio button 811 is selected via the input device 14 and an Execute button 817 is selected, the operation management program 111 starts the processing of step S101 and the subsequent steps in FIG. 6.

If a radio button 812 is selected via the input device 14, the storage management processing in a second embodiment will be performed. Reference numerals 813-816 will be described later in the second embodiment.

FIG. 9 is a diagram showing an example of the migration candidate display screen in the first embodiment. A migration candidate display screen 900 is a screen displayed on the display device 13 by the screen display processing unit 114 after step S103 (migration candidate search processing) in FIG. 6.

The migration candidate display screen 900 includes the sort type selection area 901, an analysis result display area 902, an Execute button 903, and a Cancel button 904.

The analysis result display area 902 includes the content of the analysis result table 124 (FIG. 5).

The sort type selection area 901 is an area via which one of two sort types, "time priority" and "effect priority", is selected for sorting the analysis result display area 902. When the user selects "time priority" (step S104 in FIG. 6→Time priority), the screen display processing unit 114 sorts the analysis result display area 902 in ascending order of movement times (shortest first) and redisplays the result (step S105 in FIG. 6). When the user selects "effect priority" (step S104 in FIG. 6→Effect priority), the screen display processing unit 114 sorts the analysis result display area 902 in descending order of values of "migration effect" and redisplays the result (step S106 in FIG. 6).

The analysis result display area 902 also includes radio buttons 905 each of which corresponds to a pair of a movement source candidate volume and a movement destination candidate array group. When the user selects one of the radio buttons 905 via the input device 14 and selects the Execute button 903, the operation management program 111 executes the migration from the movement source candidate volume to the movement destination candidate array group selected by the radio button 905. In the example shown in FIG. 9, the operation management program 111 executes the migration from volume LU01, which belongs to the array group AG1, to the array group AG2.

When the Cancel button 904 is selected, the selection display in the radio button 905 is erased and the screen returns to the screen where the user is requested to select a migration candidate again.

Effect of First Embodiment

The storage management apparatus in the first embodiment calculates a bandwidth, which is the amount of information transmittable between a movement source array group and a movement destination array group, and selects the migration destination array group and the migration source volume based on this bandwidth. So, the storage management apparatus of this embodiment solves the problem of an I/O load that may be generated during migration and prevents a migration failure. That is, the storage management apparatus in this embodiment migrates data from an overloaded array group to safely distribute the I/O load, thus minimizing an effect on other operation servers that will use the storage resource.

Second Embodiment

Next, a second embodiment of the present invention will be described with reference to FIG. 10 to FIG. 16. In the second embodiment, the future I/O load state of the array groups 21 and volumes 212 is estimated from the past history information for searching for a migration candidate. The second embodiment is characterized in that a migration candidate is searched for using the past history information as the performance information.

(Configuration)

Figure 10A:
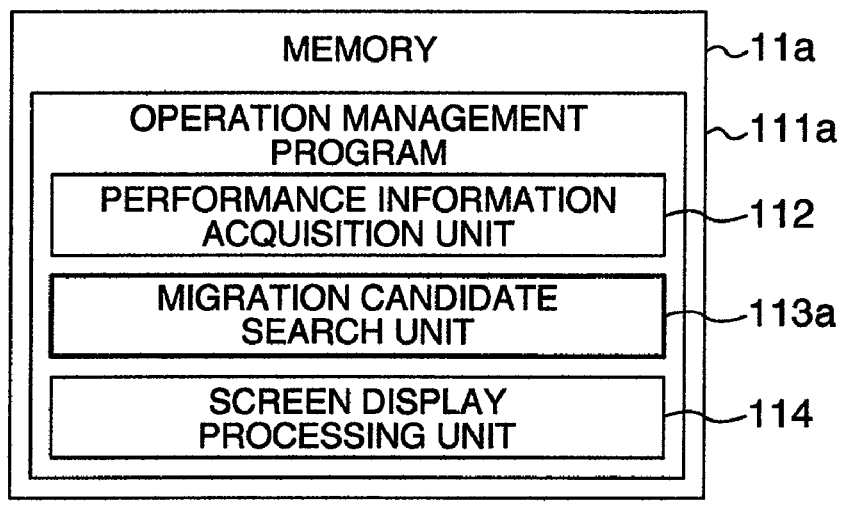
FIG. 10A is a diagram showing the configuration of a memory in a part of a storage management server in a second embodiment.
Figure 10B:
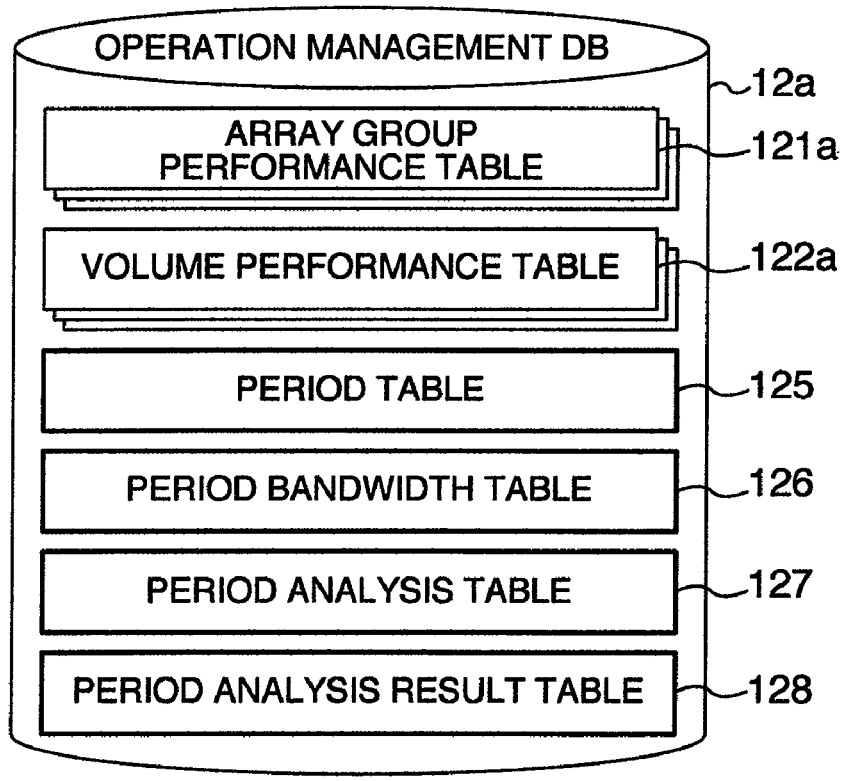
FIG. 10B is a diagram showing the configuration of an operation management DB.

FIG. 10A is a diagram showing the configuration of a memory in a storage management server in the second embodiment, and FIG. 10B is a diagram showing the configuration of an operation management DB.

In FIGS. 10A and 10B, the same reference numeral is used to denote the same element of the configuration in FIG. 1, and the further description of that element will be omitted.

As shown in FIG. 10A, an operation management program 111*a* includes a migration candidate search unit 113*a* that performs migration candidate search processing with the past history taken into consideration.

As shown in FIG. 10B, an operation management DB 12a stores array group performance tables 121a and volume performance tables 122a both of which are stored, one for each period, as well as a period table 125, a period bandwidth table 126, a period analysis table 127, and a period analysis result table 128.

The period table 125 is a table for storing information on periods that are set by the user. The period bandwidth table 126 is a table for storing the bandwidths between array groups 21 and the I/O amounts of movement source candidate volumes for each period. The period analysis table 127 is a table for storing the capacities of the volumes 212 from which data was movable in the past periods. The period analysis result table 128 is a table for storing the list of migration candidates in each period.

The period table 125, period bandwidth table 126, period analysis table 127, and period analysis result table 128 will be described later with reference to FIG. 11 to FIG. 14.

As described above, the array group performance table 121a and the volume performance table 122a are tables created for the periods that are set in the period table 125, one array group performance table 121a and one volume performance table 122a for each period.
(Period Table)

FIG. 11 is a diagram showing an example of the configuration of the period table in the second embodiment.

The period table 125 includes period IDs and periods. Although 24 hours are divided into two using the history of last one month in the example in FIG. 11, the division method is not limited to the one described above but one day may be divided into four periods of six hours each.
(Period bandwidth Table)

FIG. 12 is a diagram showing an example of the configuration of the period bandwidth table in the second embodiment.

The period bandwidth table 126 has the following columns: period ID, bandwidth between array groups (in MB/s), and movement source candidate volume I/O amount (in MB/s). The bandwidth between array groups is a bandwidth between a movement source array group and each of the movement destination candidate array groups. The period bandwidth table 126 also includes the I/O amounts of each movement source candidate volume in two columns: read I/O amount (R) and write I/O amount (W). Reference numerals 1261-1263 will be described later.
(Period Analysis Table)

FIG. 13 is a diagram showing an example of the configuration of the period analysis table in the second embodiment.

The period analysis table 127 is a table used to determine whether data can be moved from each volume 212 of a movement source array group to each movement destination candidate array group. The detail such as the procedure for generating data in the period analysis table 127 will be described later with reference to FIG. 15. The following describes the data in the period analysis table 127 by referring to a row 1271. The information in columns 1272, 1273, and 1274 corresponding to the first three columns indicates the migration of data from the volume LU04 (movement source candidate volume) of the array group AG1 to the array group AG4. The columns 1275-1278 corresponding to the next columns each indicate the capacity of the volume 212 movable in each period. That is, the column 1277 indicates that the maximum capacity of 432 GB can be migrated in period 3. This means that, when the capacity of the volume LU04 is 500 GB, the migration will not be terminated in period 3 only but the next period (period 4) must also be used. If the capacity of the volume LU04 is 432 GB or smaller, the migration will be terminated in period 3. The column 1278 is similar to the column 1277. The symbol "x" in the columns 1275 and 1276 indicates that the there is a high possibility that the migration will fail in those periods. How to determine the success and the failure of the migration in a period will be described later.
(Period Analysis Result Table)

FIG. 14 is a diagram showing an example of the period analysis result table in the second embodiment.

The period analysis result table 128, which is created by describing the content of the analysis result table 124 (FIG. 5) in the first embodiment for each period described in the period table 125, is different from the analysis result table 124 in FIG. 5 in that the movement time column in FIG. 5 is the time zone (candidate) for the migration. The number in parentheses in the time zone column indicates the number of seconds of the time described in the time zone. For example, 10000 s in the first row indicates the number of seconds generated by converting two hours and 46 minutes into seconds. Although one day is divided into two 12-hour periods in the example in the second embodiment, the movement time in the row 1281 is 13 hours and 53 minutes which is a movement time exceeding the period. This means that the migration is not terminated in one period but is extended into the next period.
(Migration Candidate Search Processing)

Next, the following describes the migration candidate search processing in the second embodiment with reference to FIG. 15 while referring to FIG. 1 and FIG. 10-FIG. 14.

FIG. 15 is a flowchart showing the flow of the migration candidate search processing in the second embodiment.

First, before starting the processing in FIG. 15, the user selects the radio button 812, enters a period (future information) during which the migration will be completed in areas 813-816, and presses the Execute button 817 on the screen shown in FIG. 8B.

For example, assume that the current date and time is 13:00 on 2008/06/01 and that the user enters 24:00 on 2008/06/30 in the areas 813-816. Upon detecting the entered data, the operation management program 111a searches for the best period for the migration using the past data collected from 0:00 on 2007/06/02 to 24:00 on 2007/06/30. That is, the operation management program 111a estimates the change in the bandwidths and the change in the I/O amounts in the future from the change in the bandwidths and the change in I/O amounts in the past and searches for the best period for the migration.

When the Execute button 817 on the screen in FIG. 8B is pressed, the operation management program 111a starts the processing in FIG. 15. Assume that the period entered in the areas 813-816 on the screen in FIG. 8B corresponds to the period "period 1" or one of the later periods in the period table 125 in FIG. 11.

First, the performance information acquisition unit 112 acquires the performance information on the array groups 21 and the volumes 212, which is information on the past periods and stored in the storage unit, from the disk processor 211 and stores the acquired performance information in the array group performance table 121a and the volume performance table 122a for each period to create the array group performance tables 121a and the volume performance tables 122a (S301). The processing in step S301 corresponds to the processing in step S101 and S102 in FIG. 6.

The following describes step S301 in detail. In the second embodiment, multiple array group performance tables 121a and multiple volume performance tables 122a, which correspond to the array group performance table 121 and volume performance table 122 in the first embodiment, are prepared as described above, one array group performance table 121a and one volume performance table 122a for each period. For example, for "period 1" in the period table 125, the performance information acquisition unit 112 calculates the average value of the performance history information (history information) in this period and creates the array group performance table 121*a* and the volume performance table 122*a* for "period 1". As described in the first embodiment, the performance history information is information on the array group usage rate, usage capacity in the volumes 212 of a movement source array group, and the read I/O amount and the write I/O amount from the application server to the volume 212. That is, the performance history information is the array group performance information and the volume performance information in the first embodiment that are stored for each period. The operation management program 111*a* acquires the performance history information for each period from the disk processor 211 and stores the acquired information in a predetermined area in the operation management DB 12*a* or in another DB.

The performance information acquisition unit 112 similarly acquires information on the rest of periods beginning with "period 2".

Next, the migration candidate search unit 113*a* acquires the array group usage rate and the maximum processing amount from the array group performance table 121*a* created in step S301 with the movement source array group ID and the movement destination candidate array group ID as the key, calculate the bandwidth between the movement source array group and the movement destination candidate array group, which is being checked, for each period (S302), and stores the calculated bandwidth in the period bandwidth table 126. The migration candidate search unit 113*a* calculates the bandwidth according to expression (1) and expression (2) given above.

Next, the migration candidate search unit 113*a* acquires a period ID from the period table 125, acquires the movement destination candidate array group ID from the array group performance table 121*a* corresponding to the period ID, and acquires the movement source candidate volume ID from the volume performance table 122*a* corresponding to the period ID. The migration candidate search unit 113*a* performs the processing in steps S304 to S305 for all sets of (period, movement destination candidate array group ID, movement source candidate volume ID) (S303).

The period bandwidth table 126 in FIG. 12 indicates the change in the bandwidth between the array group AG1 and the array group AG2 as follows. For example, the column 1261 indicates that the bandwidth between the array group AG1 and the array group AG2 is 20 MB/s in period 1, 10 MB/s in period 2, 5 MB/s in period 3, and 5 MB/s in period 4. That is, the migration candidate search unit 113*a* determines that the time zone, during which the bandwidth between the array group AG1 and the array group AG2 can be secured most, is period 1.

The migration candidate search unit 113*a* stores the movement destination candidate array group ID and the movement source candidate volume ID, acquired in step S303, and the movement source array group ID in the period analysis table 127 as a set of information (S304).

The migration candidate search unit 113*a* calculates the capacity Va of the volume 212, whose data is movable during each period, according to expression (4) given below and stores the calculated movable capacity of the volume 212 in the corresponding column in the period analysis table 127 (S305).

$$Va = (x - y) \times t \quad (4)$$

In the above expression, x is the bandwidth of the movement destination candidate array group, and y is the write I/O amount of the movement source candidate volume. t is the length of the period. As will be described later, if x<y, that is, if the value of expression (4) is negative, the migration candidate search unit 113*a* determines that the migration in this period is impossible and stores "x" in the corresponding column of the period analysis table 127.

The following describes the processing in steps S303 to S305 (creation of period analysis table 127) using an actual example.

For example, the row 1271 in the period analysis table 127 in FIG. 13 is used as the example in the description below. This row 1271 indicates how much data capacity on the volume can be moved in each period when the data of the volume 212 (movement source candidate volume) LU04 in the movement source array group AG1 is moved to the array group AG4. The migration candidate search unit 113*a* calculates the value of the data capacity of the volume 212 movable in each of the periods (values stored in the columns 1275-1278) as follows. First, the reason for "x" in the column 1275 is as follows. Note the row 1262 of "period 1" in the period bandwidth table 126 in FIG. 12. The migration candidate search unit 113*a* acquires 15 MB/s as the bandwidth of the movement destination candidate array group AG4 from the row 1262 (value of x used in the expression used in S305). In addition, the migration candidate search unit 113*a* acquires 20 MB/s from the row 1262 as the write I/O amount (W) of the movement source candidate volume LU04 (value of y used in the expression used in S305).

The migration candidate search unit 113*a* compares the value of x with the value of y and determines that, when only 15 MB/s (x) can be secured as the bandwidth between the array group AG1 and the array group AG4, data cannot be moved from the volume 212 whose write I/O amount is 20 MB/s (y), and stores x in the column 1275 in FIG. 13. That is, if the result of expression (4) in the processing in step S305 is negative, the migration candidate search unit 113*a* determines that the migration cannot be performed and stores "x" in the column 1275. The migration candidate search unit 113*a* performs the similar processing for the column 1276.

Next, the following describes the reason why 432 GB is stored in the column of period 3 (column 1277). As in the example given above, the reason is described with reference to the period bandwidth table 126 shown in FIG. 12. Note the row 1263 of period 3 in the period bandwidth table 126. The migration candidate search unit 113*a* acquires 20 MB/s as the bandwidth of the movement destination candidate array group AG4 (value of x in the expression used in S305). In addition, the migration candidate search unit 113*a* acquires 10 MB/s from the same row 1263 as the write I/O amount (W) of the movement source candidate volume LU04 (value of y in the expression used in S305). Therefore, because the bandwidth between the array group AG1 and the array group AG4 is 20 MB/s and the write I/O amount of the movement source candidate volume LU04 is 10 MB/s, the migration candidate search unit 113*a* determines that the migration can be performed with the transfer speed of 10 MB/s (=20−10) that is the difference between the bandwidth and the write I/O amount. The migration candidate search unit 113*a* calculates the capacity of the volume 212 (Va of the expression used in step S305), which is the capacity movable in 12 hours corresponding to the time stored in period 3 at the transfer speed of 10 MB/s, as 432 GB (that is, ((20 MB−10 MB)×(12×3600)) and stores the calculated value in the column 1277 in the period analysis table 127 in FIG. 13. The migration candidate search unit 113a performs the similar processing for the column 1278.

As described above, the migration candidate search unit 113a performs steps S304 to S305 for all sets of (period, movement destination candidate array group ID, movement source candidate volume ID) (S306).

Next, the migration candidate search unit 113a performs steps S308 to S310 for all sets of (movement source array group ID, movement destination candidate array group ID, movement source candidate volume ID) (S306). Because the movement source array group ID remains unchanged, the migration candidate search unit 113a performs the processing practically for all sets of (movement destination candidate array group ID, movement source candidate volume ID).

First, the migration candidate search unit 113a acquires the capacity V of the volume 212 (movement source candidate volume) corresponding to the movement source candidate volume ID from the disk processor 211 (S308).

Next, the migration candidate search unit 113a acquires the capacity Va of the data-movable volume 212 in each period from the period analysis table 127 (FIG. 13) with the movement destination candidate array group ID and the movement source candidate volume ID as the key and compares the acquired Va and V to select a movable period. After that, the migration candidate search unit 113a stores the result in the period analysis result table 128 (S309).

The following describes an example of the processing in steps S307-S309.

For example, the row 1271 in the period analysis table 127 is used as the example in the description below. The migration candidate search unit 113a determines from the row 1271 that the data of the movement source candidate volume LU04 can be migrated in period 3 and period 4. In this case, if the capacity of the volume 212 corresponding to the movement source candidate volume LU04 is 300 GB (the usage capacity of the volume 212 is acquired from the volume performance table 122a), the migration candidate search unit 113a determines that the migration can be terminated in one of period 3 and period 4. However, if the usage capacity of the volume 212 corresponding to the movement source candidate volume LU04 is 500 GB, the migration candidate search unit 113a determines that the migration cannot be terminated in one of period 3 and period 4. In such a case, the migration candidate search unit 113a outputs a period of a combination of period 3 and period 4 as a candidate for the movement period. Note that the non-continuous periods cannot be combined (for example, period 1 and period 3).

Next, the migration candidate search unit 113a calculates the movement time and the movement effect (S310) and stores the calculated result in the corresponding columns of the period analysis result table 128. The calculation of the movement time and the movement effect is the same as that in steps S211 to S214 in FIG. 7 and, so, the description is omitted.

As described above, the migration candidate search unit 113a performs steps S308 to S310 for all sets of (movement source array group ID, movement destination candidate array group ID, movement source candidate volume ID) (S311).

Thereafter, the migration candidate search unit 113a performs the same processing as that in steps S104 to S106 in FIG. 6.

Figure 16:
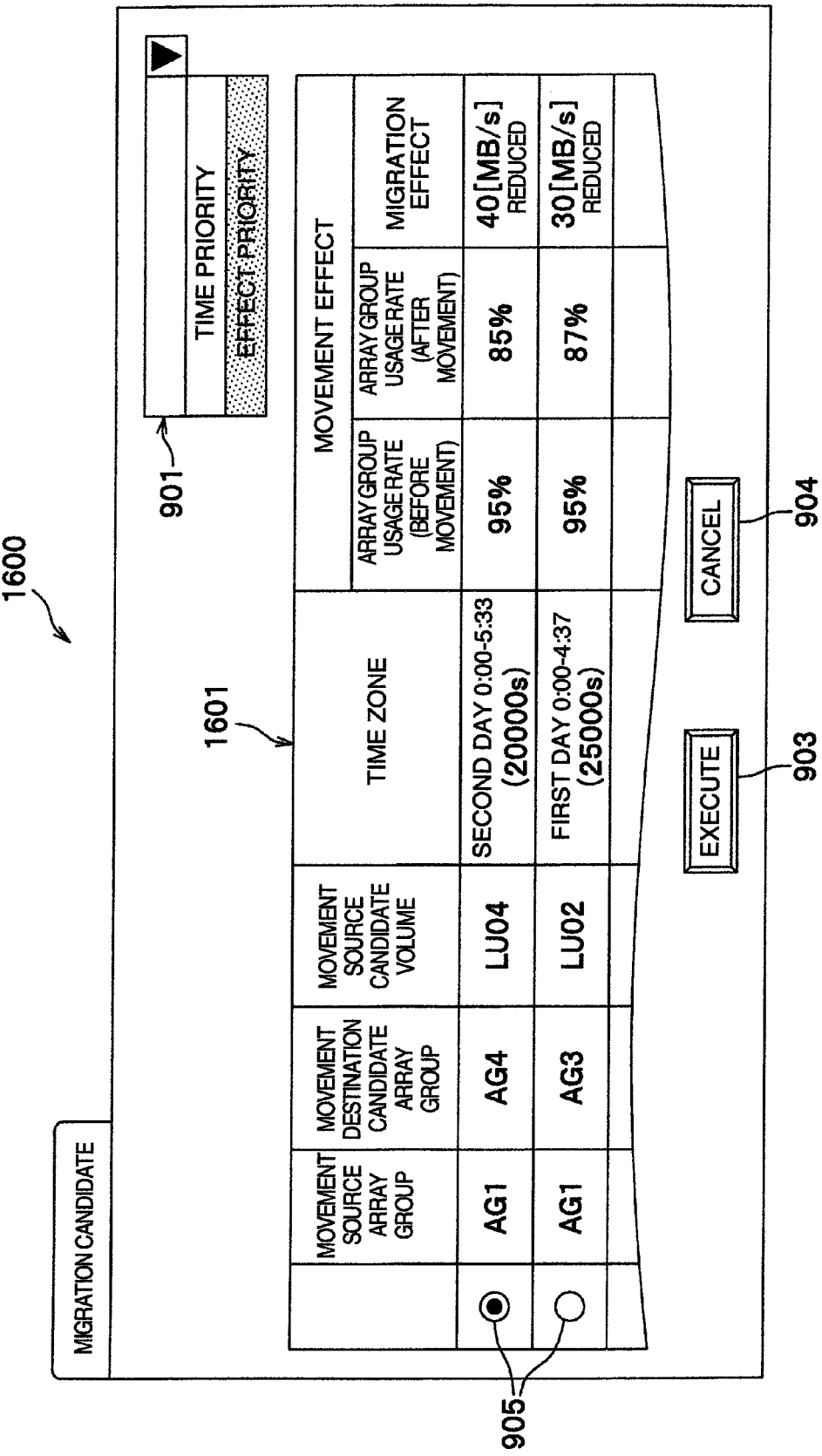
FIG. 16 is a diagram showing an example of a migration candidate display screen in the second embodiment.

FIG. 16 is a diagram showing an example of a migration candidate display screen in the second embodiment.

In FIG. 16, the same reference numeral is used to denote the same element in FIG. 9, and the further description of that element will be omitted.

This migration candidate display screen differs from the migration candidate display screen in FIG. 9 in that, in an analysis result display area 1601, the movement time in FIG. 9 is replaced by the time zone (candidates) for the migration.

The user references the period candidates to select and determine from which volume 212 the data is to be migrated to which array group 21 and when the migration is to be performed. The migration execution procedure is the same as that in the first embodiment (FIG. 9). The number in parentheses in the time zone column is the same as that in FIG. 14.

Effect of Second Embodiment

The storage management apparatus in the second embodiment uses performance history information, which is past performance information, for estimating a change in the array group bandwidths and I/O amounts in the future and finds, for example, that a larger bandwidth can be acquired, and the migration becomes easier, at the end of a month. So, the storage management apparatus allows the user to know in which period the migration should be performed. In this way, the storage management apparatus reduces failures in the migration.

Third Embodiment

Figure 17:
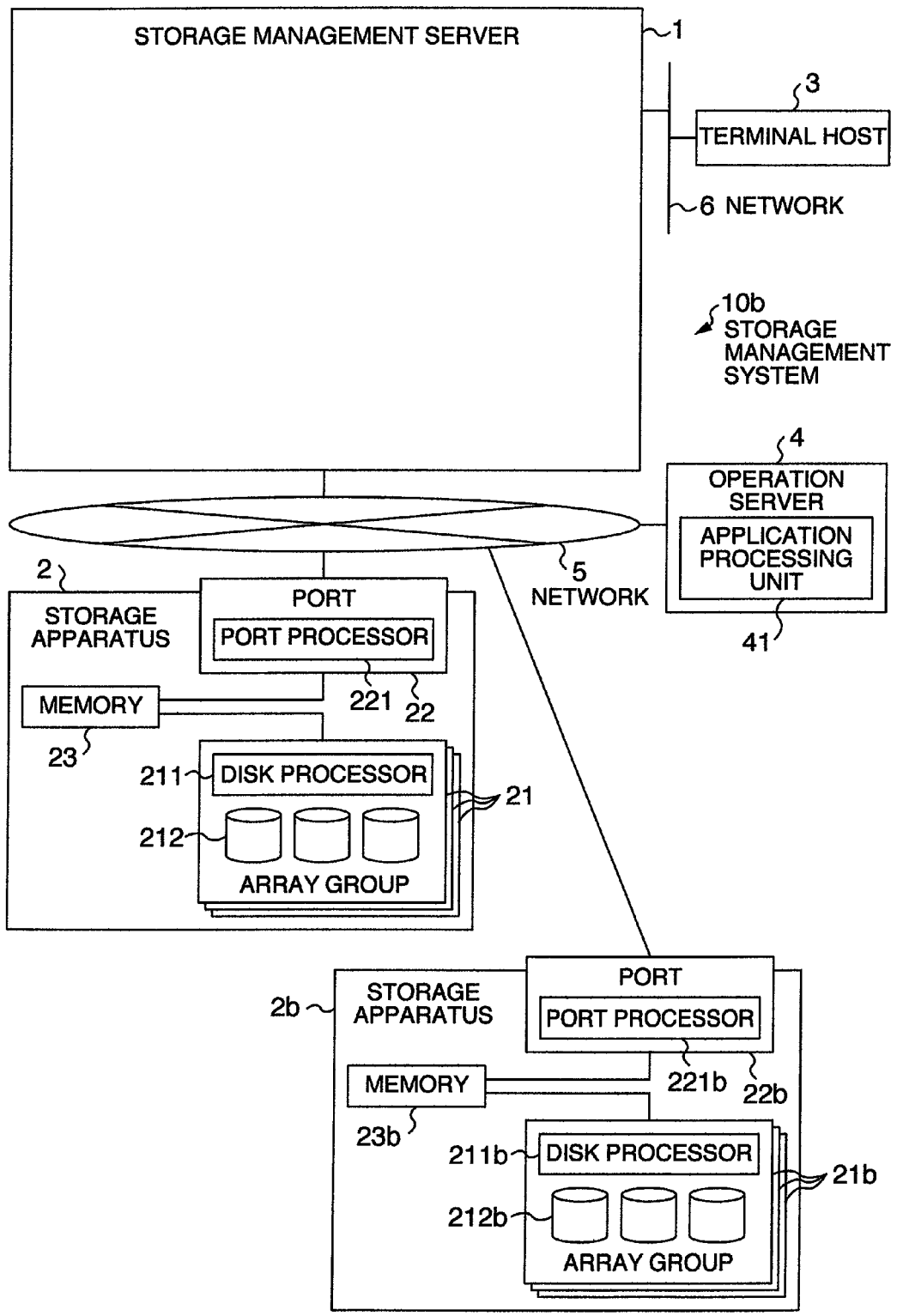
FIG. 17 is a diagram showing an example of the system configuration in a third embodiment.

Next, a third embodiment of the present invention will be described with reference to FIG. 17 and FIG. 18. In the first embodiment and the second embodiment, the migration is performed between array groups in the same storage apparatus 2 (FIG. 1). In the third embodiment, the migration is performed and managed also between different storage apparatuses 2 and 2b (FIG. 17). The storage apparatus 2b is an external storage apparatus 2 connected, via a network such as a SAN, to the storage apparatus 2 that includes a movement source array group.

(System Configuration)

FIG. 17 is a diagram showing an example of the system configuration in the third embodiment.

In FIG. 17, the same reference numeral is used to denote the same element of the configuration in FIG. 1, and the further description of that element will be omitted. The configuration of a storage management server 1 is the same as that in FIG. 1 except that the array group performance table 121 is an array group performance table 121b (FIG. 18) that considers the ports of the storage apparatuses 2 and 2b and, so, the illustration of the storage management server 1 is omitted. The array group performance table 121b will be described later with reference to FIG. 18.

FIG. 17 is a block diagram of a storage management system 10b in the third embodiment that includes the storage apparatus 2b connected to the storage apparatus 2 via a network 5. Because the elements of the storage apparatus 2b are the same as those of the storage apparatus 2, the reference numeral of an element of the storage apparatus 2b is created by adding "b" to the end of the reference numeral of the corresponding element of the storage apparatus 2, and the further description of that element will be omitted.

(Array Group Performance Table)

FIG. 18 is a diagram showing an example of the configuration of an array group performance table in the third embodiment.

The array group performance table 121b differs from the array group performance table 121 in FIG. 2 in that the port processor usage rates (in percents) and the port processor maximum processing amounts (in MB/s) of ports 22 and 22b of the storage apparatuses 2 and 2b are described. Because a port is considered, the array group ID in FIG. 2 is replaced by the resource ID. P1 and P2 in FIG. 18 are the IDs of ports 22 and 22b of the storage apparatuses 2 and 2b, respectively.

With reference to FIG. 17 and FIG. 18, the following describes how the operation management program 111 calculates the bandwidth between the array group 21 of the storage apparatus 2 and the array group 21b of the storage apparatus 2b.

Because there are the port 22 and the port 22b on the path from the array group 21 to the array group 21b, the performance information acquisition unit 112 (FIG. 1) acquires the performance information on those resources from the port processors 221 and 221b respectively and stores the acquired performance information in the array group performance table 121b (corresponds to step S101 in FIG. 6). Although the ports 22 and 22b are the resources on the path from the array group 21 to the array group 21b and their performance information is acquired in this example, the resources are not limited to the ports 22 and 22b but may be any resources such as switches.

Next, the following describes the calculation of the bandwidths secured between the array group 21 and the array group 21b. Based on the array group performance table 121b in FIG. 18, the migration candidate search unit 113 uses expression (1) and calculates the bandwidth of the array group AG1 as 20 MB/s. Similarly, the migration candidate search unit 113 uses expression (1) and calculates the bandwidth of port P1 as 200 MB/s, the bandwidth of port P2 as 120 MB/s, and the bandwidth of array group AG4 as 15 MB/s. This processing is the one performed in steps S202 and step S204 in FIG. 7. At this time, the migration candidate search unit 113 calculates the bandwidth among the array group AG1, port P1, port P2, and array group AG4 using min (20, 200, 120, 15) that is a variation of expression (2). As a result, the bandwidth among the array group AG1, port P1, port P2, and array group AG4 is 15 MB/s. This processing corresponds to step S205 in FIG. 7. The other processing is the same as that in FIG. 6 and FIG. 7, and the description of the processing is omitted.

Effect of Third Embodiment

The storage management apparatus in the third embodiment can reduce an I/O load that is generated at migration time not only between the array groups 21 in the same storage apparatus 2 but also between array groups in the different storage apparatuses 2 and 2b.

Fourth Embodiment

Next, a fourth embodiment of the present invention will be described.

In the fourth embodiment, a storage management server 1 calculates the array group usage rate of the system usage area and that of the user usage area separately based on the performance information on the array group 21 and the volume 212 at migration execution time, and displays the result on the display device 13.

The system configuration diagram in the fourth embodiment and its description are omitted because they are similar to those in FIG. 1 except that the operation management program 111 calculates the array group usage rate separately for the system usage area and for the user usage area and displays them on the display device 13.

The flowchart and its description are also omitted because they are similar to those in FIG. 6 and FIG. 7 except that the operation management program 111 calculates the array group usage rate separately for the system usage area and for the user usage area after the migration and displays them on a display device 13.

The following describes the method of calculating the array group usage rate for the system usage area and the user usage area.

First, the following describes the method of calculating the array group usage rate for the system usage area. First, when the migration is started in response to an instruction from the storage management server 1, the performance information acquisition unit 112 serially monitors the performance information (array group usage rate, read I/O amount and write I/O amount for the movement destination volume) on the movement destination array group and the movement source volume and stores the acquired information in the memory 11 or an appropriate area on the hard disk.

(Calculation of Array Group Usage Rate for Each Usage Area)

When a request for displaying the array group usage rates is issued via the input device 14, the operation management program 111 uses the stored performance information to calculate the array group usage rate for the migration separately for the system usage area and for the user usage area, and the screen display processing unit 114 displays the calculated result on the display device 13. For example, the array group usage rates are calculated as follows. Let j[MB/s] be the maximum processing amount of the array group AG1, g[MB/s] be the bandwidth secured between the array group AG1 and the array group AG2, and h[MB/s] be the write I/O amount on the movement source volume in the array group AG1. When the data of the movement source volume is moved to the array group AG2, the operation management program 111 calculates the array group usage rate F for the system area of the array group AG1, which the movement source array group, using expression (5) given below.

$$F=100\times(g-h)/j \quad (5)$$

For the array group AG2 that is the movement destination candidate array group, the operation management program 111 also uses expression (5) to calculate the array group usage rate for the system area.

The array group usage rate for the user usage area is a value calculated by subtracting the value calculated using expression (5) from the array group usage rate of the array group that is calculated and stored in the array group performance table 121 (FIG. 2.)

FIG. 19A is a diagram showing an example of the screen for the movement source array group in the fourth embodiment, and FIG. 19B is a diagram showing an example of the screen for the movement destination array group.

The horizontal axis of the graphs in the FIGS. 19A and 19B indicates the time, and the vertical axis indicates the array group usage rate (usage rate). A broken line 1905 in FIGS. 19A and 19B indicates the maximum processing amount of the array group 21.

A solid line 1901 in FIG. 19A and a solid line 1903 in FIG. 19B indicate the array group usage rate in the user usage area. A broken line 1902 in FIG. 19A and a broken line 1904 in FIG. 19B indicate the array group usage rate in the system usage area.

FIGS. 19A and 19B indicate that, when the migration is started, the array group usage rate of the movement source array group and the movement destination array group rises because of the migration.

Effect of Fourth Embodiment

The storage management apparatus in the fourth embodiment allows the user to work while confirming the array group usage rate of the system when data is migrated.

Fifth Embodiment

Next, a fifth embodiment of the present invention will be described with reference to FIG. 20 to FIG. 22.

A storage management system 10 in the fifth embodiment calculates the copy transfer speed that is expected when the migration is performed and, if there is a possibility that the migration will not be terminated within a permissible time, displays a warning on a display unit.

(Memory Configuration)

Figure 20:
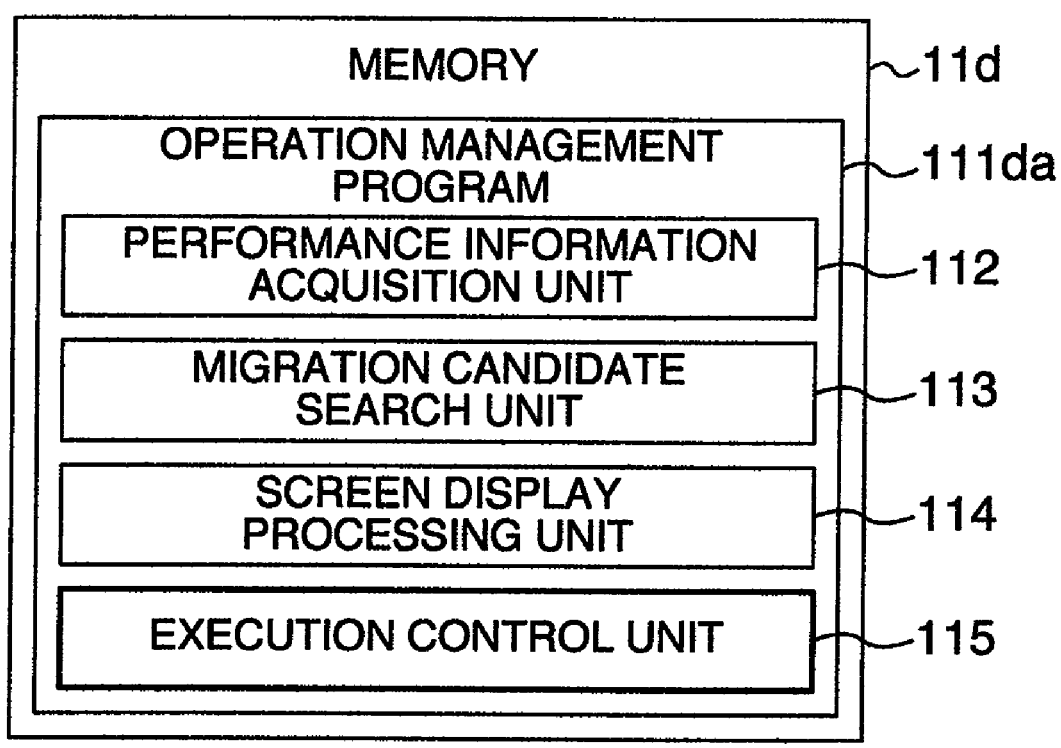
FIG. 20 is a diagram showing an example of the configuration of the memory in a storage management server in a fifth embodiment.

FIG. 20 is a diagram showing an example of the configuration of the memory in a storage management server in the fifth embodiment. A memory 1*d* in FIG. 20 differs from the memory 11 in FIG. 1 in that an operation management program 111*d* has an execution control unit 115. The description of the rest of the configuration is omitted because it is the same as the configuration of the memory 11 shown in FIG. 1. The figure and the description of the configuration other than the memory 11 in the storage management system 10 are omitted because they are the same as those in FIG. 1.

(Execution Control Processing)

Figure 21:
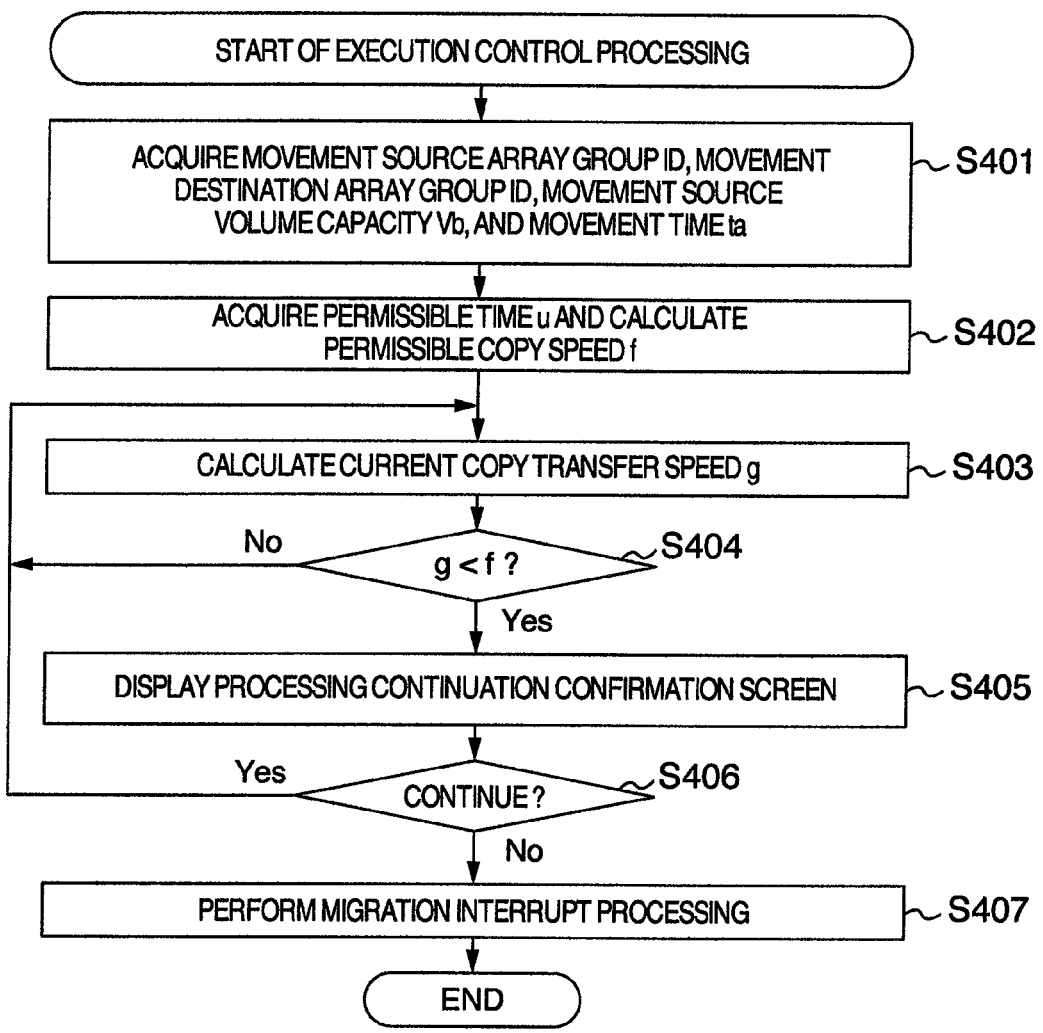
FIG. 21 is a flowchart showing the flow of execution control processing in the fifth embodiment.

Next, the following describes execution control processing in the fifth embodiment with reference to FIG. 21 while referring to FIG. 1 and FIG. 20.

FIG. 21 is a flowchart showing the flow of execution control processing in the fifth embodiment. Note that FIG. 21 shows the processing executed after a migration execution instruction is entered. For example, the processing in FIG. 21 is executed when the user presses an Execute button 2204 on a permissible time setting screen 2200 that is shown in FIG. 22.

First, the execution control unit 115 acquires the movement source array group ID, the movement destination array group ID, and the movement source volume ID for which the migration is being performed, as well as the movement time ta, from the analysis result table 124 (FIG. 5). In addition, the execution control unit 115 acquires the movement source volume capacity (usage amount) Vb from the volume performance table 122 (FIG. 3) with the movement source volume ID as the key (S401).

The execution control unit 115 acquires a pre-set permissible time u from the hard disk and calculates the permissible copy speed f (permissible transfer speed) using expression (6) given below (S402).

$$f = Vb/(ta+u) \quad (6)$$

The execution control unit 115 subtracts the write I/O amount of the movement source volume from the bandwidth between the movement source array group and the movement destination array group to calculate the current copy speed g (actual data transfer speed) (S403). The current copy transfer speed g may also be calculated by the performance information acquisition unit 112 by acquiring the data amount, which is moved within a predetermined time, from the disk processor 211 and dividing this data amount by the predetermined time.

The execution control unit 115 checks if g<f is satisfied (S404).

If g<f is not satisfied as the result of step S404 (S404→No), the current copy transfer speed g is higher than the permissible copy speed f, that is, the copy transfer speed is higher. In this case, the execution control unit 115 determines that the migration will be terminated within (movement time+permissible time) (ta+u) and passes control back to step S403.

If g<f is satisfied (S404→Yes) as the result of step S404, the current copy transfer speed g is equal to or lower than the permissible copy speed f, that is, the copy transfer speed is equal to or lower than the permissible speed. In this case, the execution control unit 115 determines that there is a possibility that the migration will not be terminated within (movement time+permissible time) (ta+u).

After that, the execution control unit 115 causes the display unit to display the processing continuation confirmation screen that will be described later by referring to FIG. 22B (S405).

The execution control unit 115 determines if an instruction to continue the migration is entered via the input unit and determines whether the migration should be continued (S406).

If it is determined as the result of step S406 that the migration should be continued (S406→Yes), the execution control unit 115 passes control back to step S403.

Conversely, if it is determined as the result of step S406 that the migration should not be continued (S406→No), the execution control unit 115 interrupts the migration processing (S407).

The following describes an example of the actual processing in FIG. 21.

The execution control unit 115 calculates the currently secured bandwidth from the performance information on the movement source array group AG1 and the movement destination array group AG2 (The calculation of the bandwidth has already described using the flowchart in FIG. 7 in the first embodiment). For example, assume that the bandwidth is 10 MB/s (S401).

In step S401, assume that the execution control unit 115 has acquired 10 MB as the usage capacity of the movement source volume, and is as the movement time (estimated time).

Assume that the user has set the permissible time of is (second) in advance. The permissible time indicates that the migration will be completed in 1 s and, at the latest, within 2 s. The value of the permissible copy speed f calculated in step S402 indicates that, unless the migration is performed at least at this copy transfer speed, there is a possibility that the migration will not be completed within the user-assumed time of (2 s).

In step S403, the execution control unit 115 calculates the current copy transfer speed, compares the current copy speed with the permissible copy speed in step S404, and checks if the migration will be completed within the user-assumed time (2 s in this example). If the checking indicates that the migration will not be completed within the user-assumed time, the execution control unit 115 displays the processing continuation confirmation screen (S405) to request the user to determine whether to continue the migration (S406).

(Example of Screen)

Figure 22A:
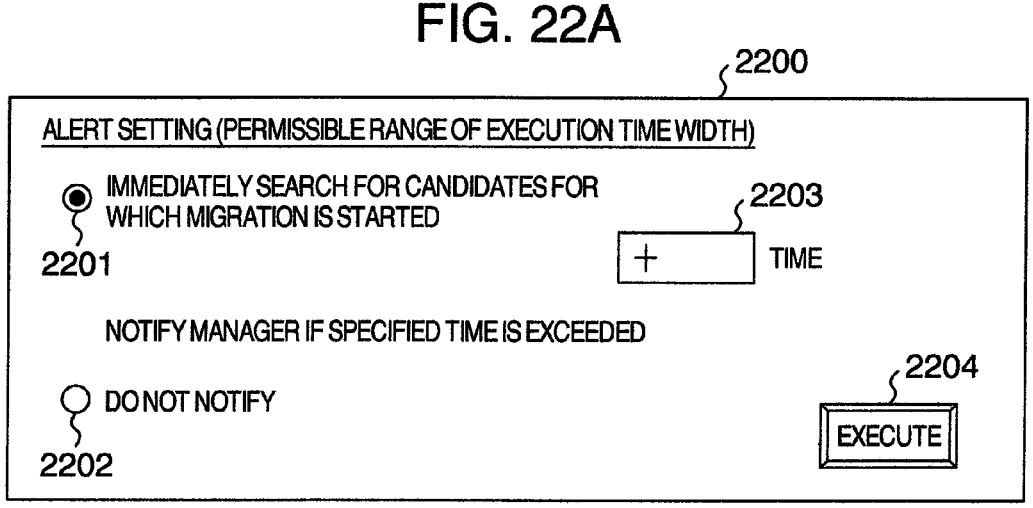
FIG. 22A is a diagram showing an example of a permissible time setting screen in the fifth embodiment.
Figure 22B:
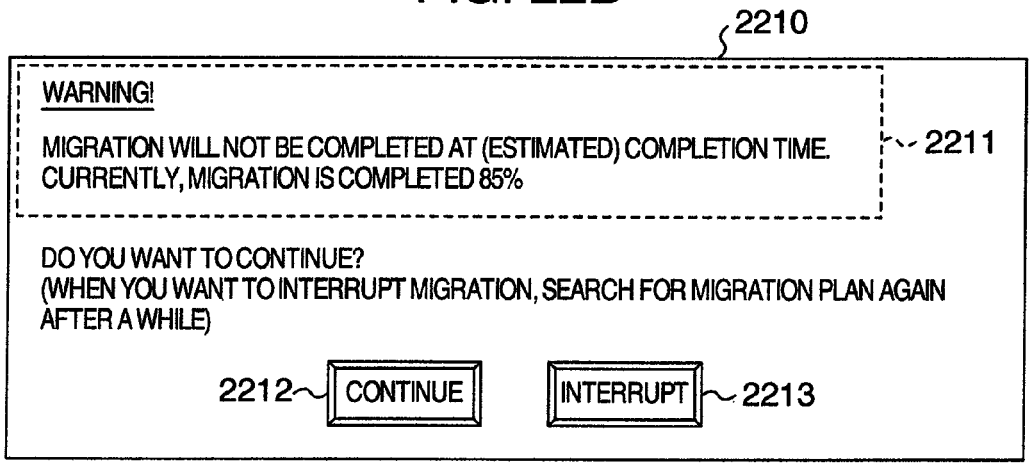
FIG. 22B is a diagram showing an example of a processing continuation confirmation screen.

FIG. 22A is a diagram showing an example of the permissible time setting screen in the fifth embodiment, and FIG. 22B is a diagram showing an example of the processing continuation confirmation screen.

As shown in FIG. 22A, the permissible time setting screen 2200 includes a permissible time setting selection radio button 2201 and a warning non-notification selection radio button 2202. When the user selects the permissible time setting selection radio button 2201, enters a permissible time in a permissible time setting area 2203, and presses the Execute button 2204, the migration is started and, at the same time, the processing described in FIG. 2 is performed. When the warning non-notification selection radio button 2202 is selected, the storage management server 1 performs the migration without performing the processing described in FIG. 21.

A processing continuation confirmation screen 2210 shown in FIG. 22B is a screen displayed on the display unit by the execution control unit 115 in step S405 in FIG. 21. The processing continuation confirmation screen 2210 includes a warning display area 2211, a Continue button 2212, and an Interrupt button 2213. When the Continue button 2212 is selected, "Yes" is selected in step S406; when the Interrupt button 2213 is selected, "No" is selected in step S406.

In the fifth embodiment, the monitoring processing of the array group usage rate shown in the fourth embodiment may be performed at the same time.

Effect of Fifth Embodiment

The storage management apparatus in the fifth embodiment allows the user to monitor the data copy speed during migration and to confirm whether or not the migration will be terminated within a user-desired time.

In the first to fifth embodiments, the operation management programs 111, 111a, and 111d may multiply the bandwidth value used in those embodiments by a value larger than 0 and smaller than 1. By doing so, the bandwidth is estimated conservatively and the transmission load at migration time can be reduced.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A storage management apparatus that moves data of a volume of a source array group to a destination array group, the source array group being one of a plurality of array groups each having a plurality of volumes provided in a storage apparatus, said storage management apparatus comprising:
 a central processing unit;
 a memory;
 a volume search unit configured to 1) calculate unused bandwidth, based on a usage rate and a maximum data processing capacity of each array group acquired from a disk processor that manages an input/output of data to and from the plurality of array groups, 2) calculate a bandwidth based on said unused bandwidths, said calculated bandwidth being a smaller capacity for data processing available between the source array group and the destination array group, and 3) select the volume, from the plurality of volumes of the source array group, for writing data therefrom, the selected volume having a write data transfer speed for write transmission that is smaller than the calculated bandwidth; and
 an operation management unit configured to move data of the selected volume to a volume of the destination array group,
 wherein for an array group the unused bandwidth is calculated by expression:

$$c = b \times \{1 - (a/100)\} \quad (1)$$

where a is a usage rate, b is a maximum data processing capacity, and c is a bandwidth; and
 wherein the bandwidth between the source array group and the destination array group is calculated by the expression given below:

$$c3 = \min(c1, c2) \quad (2)$$

where c1 is a bandwidth of the source array group, c2 is a bandwidth of the destination array group, and c3 is the bandwidth between the source array group and the destination array group.

2. The storage management apparatus according to claim 1 wherein
 said volume search unit further comprises a function to calculate a data movement time based on the calculated bandwidth and the write data transfer speed.

3. The storage management apparatus according to claim 1 wherein
 said volume search unit further comprises a function to calculate a degree of I/O load reduction in the source array group based on the write data transfer speed of the selected volume.

4. The storage management apparatus according to claim 1 wherein
 there are a plurality of the selected volumes, and
 said volume search unit has a function to
 calculate a data movement of time of each of the selected volumes based on the calculated bandwidth and the write data transfer speed and
 calculate a degree of I/O load reduction in the source array group based on the write data transfer speed of each of the selected volumes,
 said storage management apparatus further comprising a screen display processing unit that causes a display unit to display the data movement times and the degree of I/O load reduction, as well as information on each of the selected volumes, and requests a user, via an input unit, to select whether information on the selected volumes is displayed in order of data movement time or in order of degree of I/O load reduction.

5. The storage management apparatus according to claim 1 wherein
 history information in the past is stored in a storage unit, one unit of information for each of the array groups, said history information including information on bandwidths of the array groups and the write data transfer speeds of the volumes of the array groups, and
 said volume search unit further comprises
 a function to estimate the bandwidths of the array groups and the write data transfer speeds of the volumes of the array groups in the future based on the history information.

6. The storage management apparatus according to claim 5 wherein
 the history information is stored for each of a plurality of predetermined periods, and
 said volume search unit further comprises a function to select sets of volumes from which data can be moved and array groups that are a destination of the data, one set for each of the predetermined periods, based on the estimated bandwidths and the write data transfer speeds,
 said storage management apparatus further comprising a screen display processing unit that causes a display unit to display a set of source volume information and destination array group information, as well as a future period corresponding to one of the predetermined periods, said source volume information being information on the volume from which data can be moved, said destination array group information being information on the destination array group that is a destination of the data.

7. The storage management apparatus according to claim 6 wherein
said screen display processing unit causes said display unit to display a plurality of future information, each unit of future information being a set of the source volume information, the destination array group information, and information on a future period corresponding to one of the predetermined periods, and
said operation management unit further comprises a function that, when predetermined future information is selected from the displayed future information via an input unit, moves data from a source volume corresponding to the source volume information included in the future information to the destination array group corresponding to the destination array group information included in the future information during a future period in the selected future information.

8. The storage management apparatus according to claim 1 wherein
said operation management unit further comprises a function to move data from a source volume of a first one of a plurality of storage apparatuses to a destination volume of a second one of said storage apparatuses different than the first storage apparatus, and
the bandwidth is a value calculated by considering the write data transmission speed consumed by a resource in each of said first and second storage apparatuses.

9. The storage management apparatus according to claim 1 wherein,
said operation management unit further comprises a function to separately calculate, during execution of the movement, a usage rate of array groups consumed by a system and a usage rate of array groups consumed by a user operation.

10. The storage management apparatus according to claim 1, further comprising a screen display processing unit that causes a display unit to display a change in an I/O load of data source array groups and in data destination array groups on a time basis.

11. The storage management apparatus according to claim 1, further comprising an execution control unit that calculates a permissible transfer speed produced by dividing a data amount of all data stored in a source volume by a predetermined time, monitors an actual transfer speed of the data during a movement of the data and, if the permissible transfer speed becomes equal to or lower than the actual transfer speed, displays a warning on a display unit.

12. The storage management apparatus according to claim 11, further comprising an execution control unit that displays the warning and, at the same time, requests a user to enter information indicating whether to continue the data movement via an input unit and, if information indicating that the data movement will not be continued is entered, interrupts the data movement.

13. The storage management apparatus according to claim 1 wherein
said volume search unit multiplies the bandwidth by a numeric value smaller than 1 and larger than 0.

14. A storage management method for use by a storage management apparatus that moves data of a volume of a source array group to a destination array group, the source array group being one of a plurality of array groups each having a plurality of volumes provided in a storage apparatus, said storage management method performed by said storage management apparatus and comprising the steps of:
calculating unused bandwidth, based on a usage rate and a maximum data processing capacity of each array group acquired from a disk processor that manages an input/output of data to and from the plurality of array groups,
calculating a bandwidth based on said unused bandwidths, said calculated bandwidth being a smaller capacity for data processing available between the source array group and the destination array group; and
select the volume, from the plurality of volumes of the source array group, for writing data therefrom, the selected volume having a write data transfer speed for write transmission that is smaller than the calculated bandwidth; and
moving data of the selected volume to a free volume of the destination array group,
wherein for an array group the unused bandwidth is calculated by expression:

$$c = b \times \{1 - (a/100)\} \qquad (1)$$

where a is a usage rate, b is a maximum data processing capacity, and c is a bandwidth; and
wherein the bandwidth between the source array group and the destination array group is calculated by the expression given below:

$$c3 = \min(c1, c2) \qquad (2)$$

where c1 is a bandwidth of the source array group, c2 is a bandwidth of the destination array group, and c3 is the bandwidth between the source array group and the destination array group.

15. A non-transitory computer-readable medium encoded with a storage management program that, when executed by a computer, causes the computer to execute the storage management method according to claim 14.

* * * * *